US006072486A

United States Patent [19]

Sheldon et al.

[11] Patent Number: 6,072,486
[45] Date of Patent: Jun. 6, 2000

[54] SYSTEM AND METHOD FOR CREATING AND CUSTOMIZING A DESKBAR

[75] Inventors: Michael G. Sheldon; Richard Wales Stoakley, both of Seattle; Chee H. Chew, Redmond, all of Wash.

[73] Assignee: Microsoft Corporation, Redmond, Wash.

[21] Appl. No.: 09/006,345

[22] Filed: Jan. 13, 1998

[51] Int. Cl.[7] ........................................ G06F 3/00
[52] U.S. Cl. ..................... 345/339; 345/348; 345/354; 345/333
[58] Field of Search ................... 345/145, 333–335, 345/339–340, 348–349, 351, 354; 709/300, 302

[56] References Cited

U.S. PATENT DOCUMENTS

| | | | |
|---|---|---|---|
| 5,546,528 | 8/1996 | Johnston | 345/344 |
| 5,644,737 | 7/1997 | Tuniman et al. | 345/352 |
| 5,644,739 | 7/1997 | Moursund | 345/354 |
| 5,757,371 | 5/1998 | Oran et al. | 345/348 |
| 5,801,701 | 9/1998 | Koppolu et al. | 345/352 |
| 5,825,357 | 10/1998 | Malamud et al. | 345/340 |
| 5,874,958 | 2/1999 | Ludolph | 345/339 |

*Primary Examiner*—Raymond J. Bayerl
*Assistant Examiner*—X. L. Bautista
*Attorney, Agent, or Firm*—Jones & Askew, LLP

[57] ABSTRACT

A system and method for creating and customizing an architectural component, namely a deskbar. The deskbar may simultaneously contain toolbars and toolbar components from multiple application programs, and may exist in an application window or on the desktop. This allows a user to select toolbar components or entire toolbars from one or more application programs and house these toolbars or toolbar components in a single deskbar. Users may also create new deskbars and populate them with selected toolbars and toolbar components. The user is then able to use these tool bar components and toolbars to perform their standard functions at any time without being required to directly access the specific application program that is associated with the toolbar component or toolbar. The user is also able to resize, move, and delete deskbars as desired by direct manipulation. Furthermore, a deskbar is operable throughout deskbar-aware environments, such as an operating system or various application programs and their associated application windows.

14 Claims, 25 Drawing Sheets

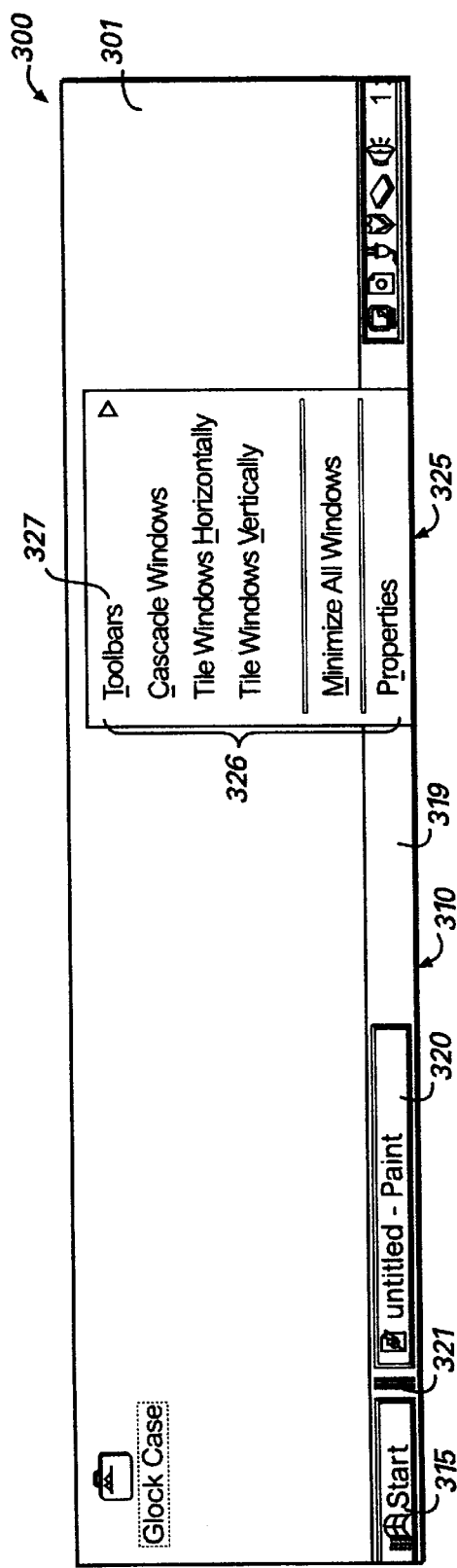
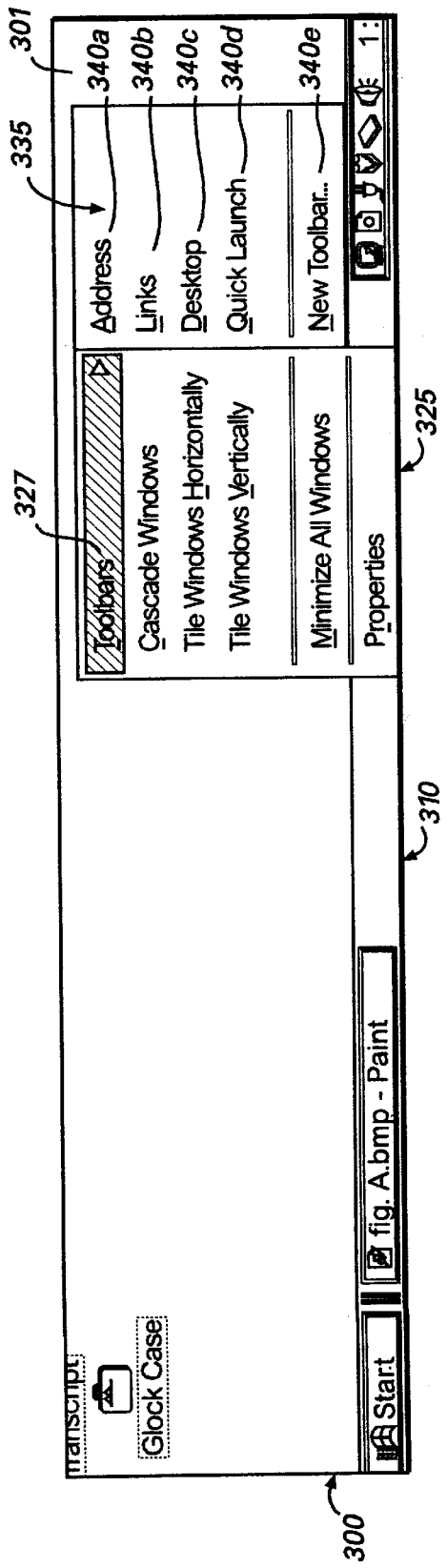
FIG.4a
FIG.4b

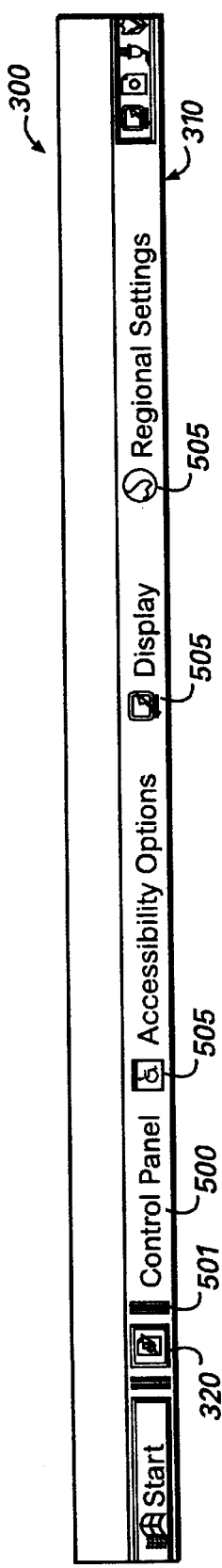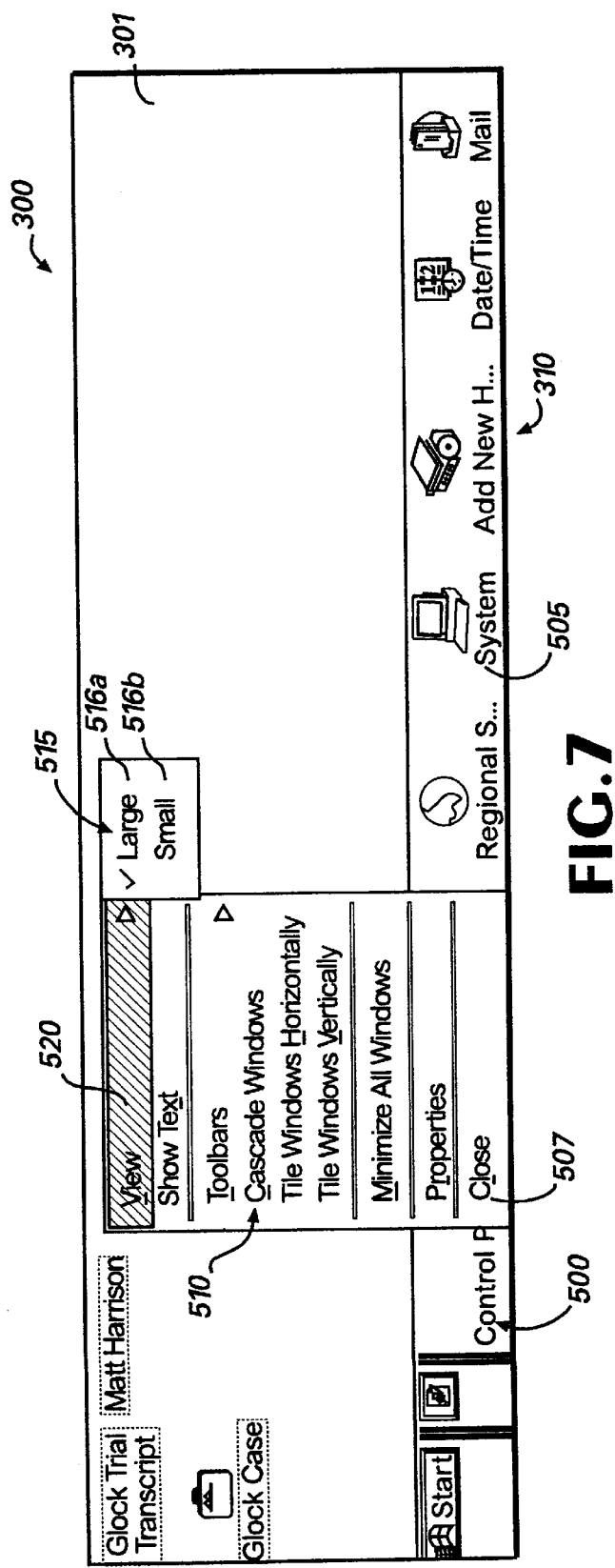
FIG. 6
FIG. 7

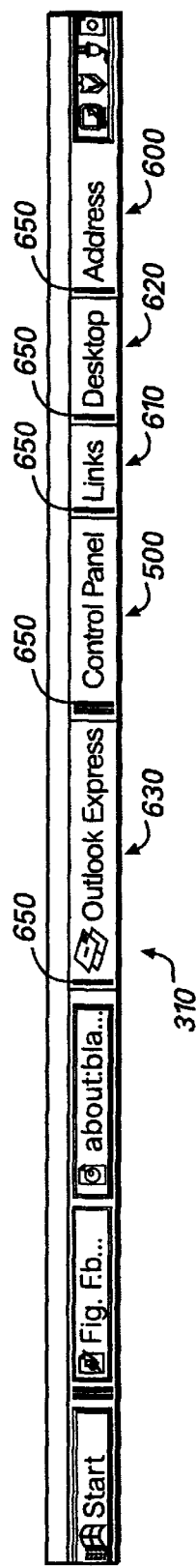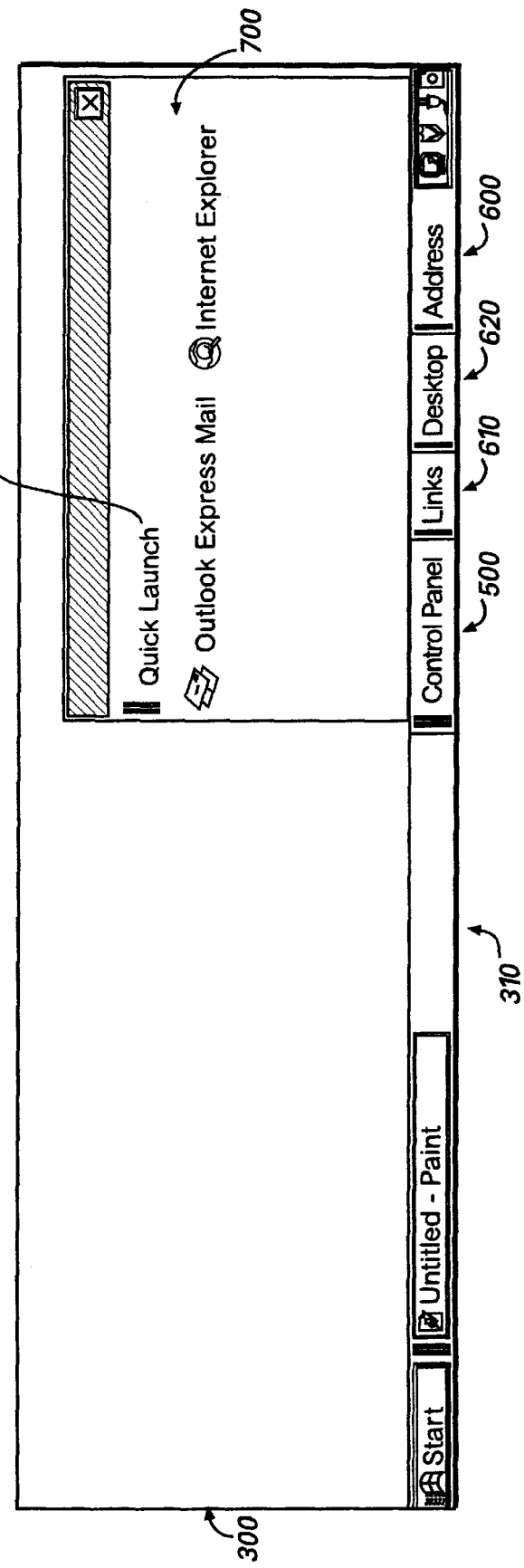
FIG. 8e
FIG. 9

SYSTEM AND METHOD FOR CREATING AND CUSTOMIZING A DESKBAR

TECHNICAL FIELD

The present invention relates to a system and method for displaying and manipulating items in a graphical operating system, and more particularly relates to a system and method for managing and presenting sets of user interface components for directly accessing data and implementing functions associated with program modules, such as application programs and operating system shells.

BACKGROUND OF THE INVENTION

Most modern computer software employs a graphical user interface to convey information to and receive commands from users. The graphical user interface relies on a variety of graphical user interface (GUI) elements or objects, including icons, text, drop-down menus, dialog boxes, toolbars, buttons, and the like. A user typically interacts with a graphical user interface by using a pointing device (e.g., a mouse) to position a pointer or cursor over an object and "clicking" on the object. An example of an operating system that provides a graphical user interface is the "WINDOWS 95" operating system, which is manufactured and sold by Microsoft Corporation of Redmond, Wash.

In an operating system that employs a graphical user interface, toolbars are common GUI elements that provide an effective way to display numerous computer commands. Toolbars are GUI elements associated with an application window, which is a window displayed by a particular application program in which the primary viewing and/or editing interaction occurs. Toolbars provide access to a set of commands that are usually represented by buttons, menu buttons, comboboxes, and other UI controls. A user can invoke any command in the toolbar by clicking on the associated button or UI control. Toolbars typically present groups of controls arranged in rows or columns. Although most toolbars are visually attached to an application window, some may float above, below, or to the side of an application window. The primary advantage of toolbars is that the included commands are only one click away while the user is using the associated application program.

In most application programs that employ toolbars, the toolbars can be modified by adding or deleting buttons, or by changing the function associated with a button. This allows the user to customize a toolbar so that the toolbar provides convenient access to the commands that are most frequently used by the user. In addition, these application programs support multiple toolbars that can be turned on and off, thereby providing the user with the option of viewing two or more toolbars simultaneously. Once the user exits an application program, the associated toolbars are terminated along with the application program and are not accessible without launching the application program and directly accessing the UI associated with the particular application program.

Some prior art systems are designed to reserve a region of a display screen for toolbars at all times regardless of whether another application program is currently active. If several application programs each require a certain amount of space, the display screen workspace may be greatly reduced. These systems do not provide a uniform interface that would allow an application program to negotiate display screen real-estate with a host program module, such as an operating system or another application program.

In many prior art systems, developers have to design every component or feature that the developer needs to provide specific functionality for the systems. These prior art systems are typically difficult and time-consuming to develop, maintain, and revise. Revising these systems is a problem because features are typically intertwined such that the features cannot be individually updated or replaced. In addition, the systems are not easily integrated as they may use different programming languages or they may run in separate processes. Inevitably the developer has difficulty utilizing the functionality of pre-existing software due to the incompatibility of programming languages and so forth. Consequently, these systems do not provide a simplified way of integrating program modules and data such that key functionality can be utilized across various systems, thereby facilitating system integration.

Therefore, there is a need for a system and method for managing and presenting UI components for directly accessing data and functions associated with an application program without having to launch the application program and access the UI associated with the application program. There is a further need for a system and method that allow a UI element to negotiate display screen real-estate with its host. There is yet another need for a system and method that provide a deskbar that can be resized, moved, added or deleted via direct on-screen manipulation. There is yet another need for an architecture that facilitates system integration.

SUMMARY OF THE INVENTION

The present invention satisfies the above-described needs by providing an improved method for uniformly creating, displaying, and manipulating components or band objects on a desktop, which refers to the UI presented by a graphical operating system, so those band objects can be created and used by multiple application programs. An architectural component known as a deskbar manages and presents sets of tool-type UI components for accessing data and implementing functions associated with multiple application programs. The deskbar facilitates easy extensibility and interoperation of toolbar items associated with multiple application programs. The deskbar is designed to be highly customizable and can be adapted to work well in any deskbar-aware environment.

Generally described, the present invention provides a system for uniformly creating, displaying, and manipulating band objects for use with a plurality of application programs. The system includes a band object, a deskbar, and a deskbar site. The band object provides access to a function or data associated with an application program. The deskbar displays the band object on a desktop. The deskbar site interacts with the deskbar to negotiate display screen real-estate to display the deskbar. Together, the system allows the band object to be created and used by multiple application programs by way of the deskbar. The system can also include a bandsite, the bandsite being operative to manage the band object by determining at least one preference associated with the band object. Furthermore, the deskbar site is selected from a group including an application program and an operating system shell.

In another aspect, the present invention provides a method for creating a deskbar. The method includes displaying a first existing deskbar having a deskband in a predetermined area. In response to an indication that the deskband has been moved out of the predetermined area, the method determines whether the deskbar has been moved to a second existing deskbar. If not, a new deskbar is created. The new deskbar contains the deskband. If so, the deskband is displayed in the second existing deskbar.

In another aspect, the present invention provides a method for manipulating and using band objects between application windows associated with their respective application programs and a desktop associated with a host operating system. The method includes moving a band object from a first application window associated with a first application program to the desktop, preferably in a deskbar. Next, a second application program is accessed. The band object is then used in connection with the second application program without accessing the first application program. Although the band object is now used in connection with the second application program, the band object provides access to a function associated with the first application program. Moreover, other application programs can be accessed and their associated band objects can be moved to the desktop, preferably in the same or a different deskbar, so that the associated band objects can be used in the context of any application program without having to access or execute their associated application programs.

Advantageously, the present invention provides a system and method for managing and presenting UI components for directly accessing data and functions associated with an application program without having to launch the application program and access all of the UI associated with the application program. The present invention also provides a system and method that allow a UI element to negotiate display screen real-estate with its host. In addition, the present invention provides a system and method that provide a deskbar that can be resized, moved, added, or deleted via direct on-screen manipulation. Finally, the present invention provides an architecture that facilitates system integration.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 4, consisting of FIGS. 4a and 4b, depicts screen displays illustrating a deskbar and associated menus displayed by an operating system in accordance with an embodiment of the present invention.

FIG. 6 illustrates a deskbar containing a control panel toolbar in accordance with an embodiment of the present invention.

FIG. 7 illustrates a deskbar having a control panel toolbar and associated drop down menu in accordance with an embodiment of the present invention.

FIG. 9 is a screen display illustrating the creation of a new desk bar from an existing desk bar in accordance with an embodiment of the present invention.

DETAILED DESCRIPTION

The present invention provides a system and method for uniformly creating, displaying, and manipulating components or band objects on a desktop, which refers to the UI presented by a graphical operating system, so they can be created and used by multiple application programs. The present invention may employ an object-oriented programming framework that supports consistent and reusable components. In an exemplary embodiment, the invention is incorporated into the "INTERNET EXPLORER" web browser application program, which is produced and distributed by Microsoft Corporation of Redmond, Wash. Those skilled in the art will appreciate that the "INTERNET EXPLORER" application program runs on Microsoft Corporation's "WINDOWS 95" or "WINDOWS NT" operating systems and utilizes several features that are associated with these operating systems. For example, the "WINDOWS 95" and "WINDOWS NT" operating systems provide a system registry, which is a system-wide database used for system configuration, and a rebar control, which acts as a container for child windows. The "WINDOWS 95" or "WINDOWS NT" operating systems also support Microsoft Corporation's Object Linking and Embedding (OLE) interface. Information about the operating systems, OLE, and other operating system components are available in their associated documentation.

In the "INTERNET EXPLORER" application program, an architectural component known as a deskbar manages and presents sets of tool-type UI components for accessing data and implementing functions associated with multiple application programs. The deskbar facilitates easy extensibility and interoperation of toolbar items associated with multiple application programs. The deskbar architecture, as well as its creation and customization features will be described in greater detail herein below with respect to FIGS. 1–22, wherein like elements are represented by like numerals throughout the several figures.

Figure 1:
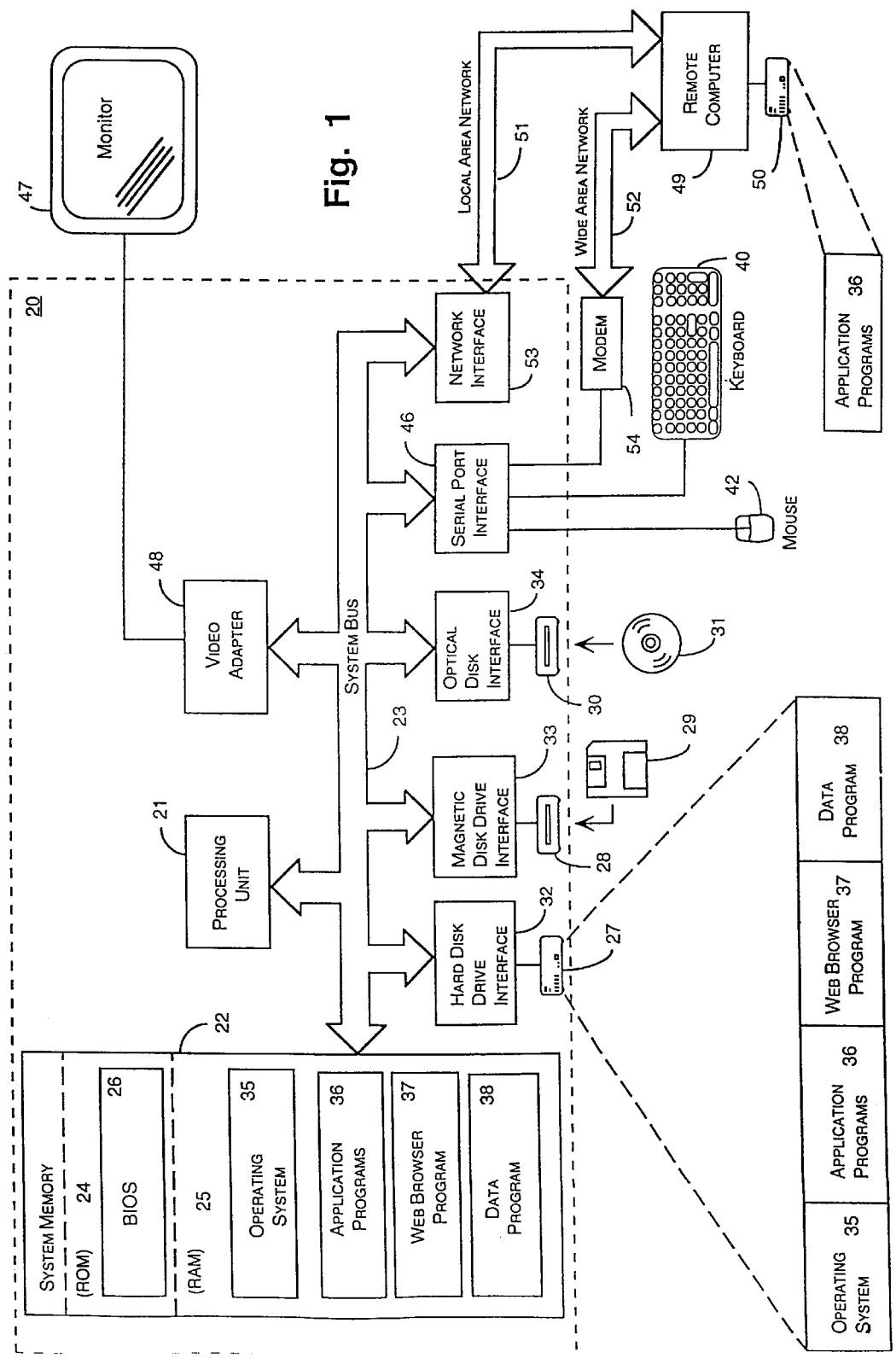
FIG. 1 is a block diagram of a personal computer that provides the operating environment for an exemplary embodiment of the present invention.

Now turning to FIG. 1, an exemplary operating environment for an embodiment of the present invention is described.

EXEMPLARY OPERATING ENVIRONMENT

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, operating systems, application programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a web browser application program 37, and program data 38. A user may enter commands and information into the personal computer 20 through a keyboard 40 and pointing device, such as a mouse 42. Other input devices (not shown) may include a pen, touch-operated device, microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, application programs depicted relative to the personal computer 20, or portions thereof, may be stored in the remote memory storage device. It will be appreciated that the network connections shown are exemplary and other means of establishing a communications link between the computers may be used.

DESKBAR OVERVIEW AND ARCHITECTURE

The present invention provides a system and method for uniformly creating, displaying, and manipulating components or band objects on a desktop, which refers to the UI presented by a graphical operating system, so they can be created and used by multiple application programs. The system includes (1) a customizable list of elements for display; (2) a component(s) for determining and modifying the display configuration in relation to other desktop elements; and (3) a uniform way for application programs to interact with these components. The present invention may employ an object-oriented programming framework, which supports consistent and reusable components. In one embodiment, an architectural component known as a deskbar manages and presents sets of tool-type UI components for accessing data and implementing functions associated with multiple application programs. The deskbar facilitates easy extensibility and interoperation of toolbar items associated with multiple application programs.

Deskbars provide several benefits to users. A deskbar may simultaneously contain toolbars and toolbar components from multiple application programs, and may exist in an application window or on the desktop. This allows a user to select toolbar components or entire toolbars from one or more application programs and house these toolbars or toolbar components in a single deskbar. The user may also create new deskbars and populate them with selected toolbars and toolbar components. The user is then able to use these toolbar components and toolbars to perform their standard functions at any time without being required to directly access the specific application program that is associated with the toolbar component or toolbar. The user is also able to resize, move, and delete deskbars as desired by direct manipulation. In other words, deskbars are designed to be highly customizable and can be adapted to work well in any deskbar-aware environment.

A principle benefit of the present invention is improved access to commands and information that a user needs. Deskbars may be used to provide frequent (or immediate) access to a command or to information. For example, if a user often accesses files from a particular file share, the user can create a deskbar containing an object that represents the file share. When the deskbar is placed on the desktop or in the taskbar, it makes the task of opening the file much easier because the file share is always accessible. Deskbars may also be used to provide information or a command in a context-insensitive manner. For example, if the deskbar is located on the desktop, it is accessible while the user is using almost any other application program. This would make a deskbar an ideal container for a dictionary look-up feature so that the feature is available regardless of the particular application program the user is using at any given time (e.g., word processing, spreadsheet, email, web browser, etc.).

Figure 2:
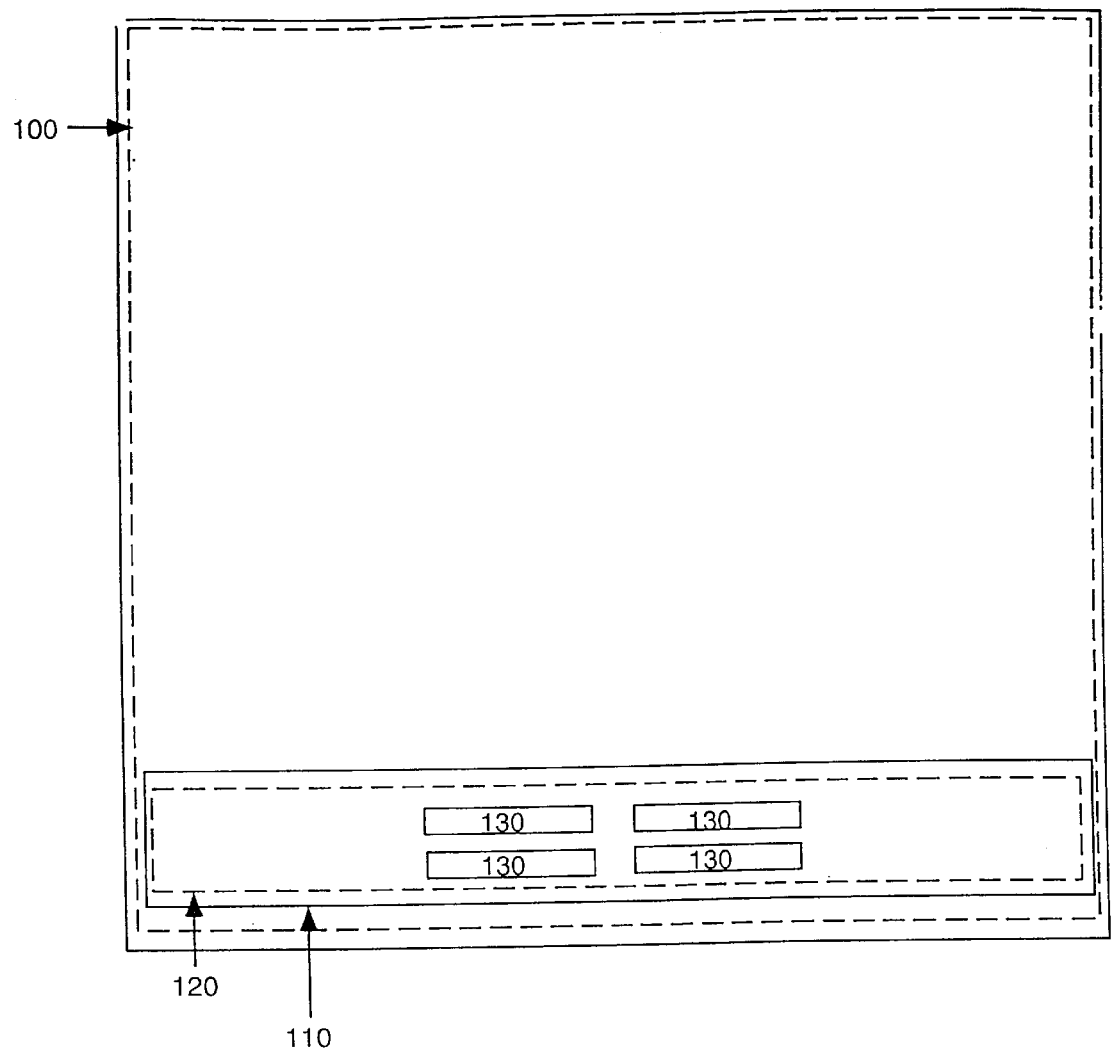
FIG. 2 is a diagram illustrating the architectural components employed in an embodiment of the present invention.

The deskbar architecture provides several benefits to software developers who want to implement tool-like objects. FIG. 2 illustrates an exemplary architecture of the present invention. In an exemplary embodiment, the deskbar architecture includes four main components: a deskbar site 100, a deskbar 110, a bandsite 120, and a deskband 130. Although the architecture of the present invention is illustrated as a screen display having a deskbar 110 and deskbands 130, the main components 100, 110, 120, and 130 represent the underlying data structure or architecture for operation and implementation of the present invention.

The deskbar site 100, such as an application program, a desktop browser, or any type of operating system shell, includes low level code that creates the deskbar 110 and deskband 130. The deskbar site 100 is also capable of manipulating (e.g., saving, loading, resizing, etc.) the deskbar 110. The deskbar 110 is the component that interacts with the deskbar site 100 to negotiate for space on the display screen. Each deskbar 110 contains a single component, a bandsite 120. A bandsite 120 hosts and manages multiple tool-like band objects or deskbands 130. The bandsite 120 manages deskbands 130 by manipulating the position and size of the deskbands 130. Each of these components will be described in greater detail below in connection with FIGS. 3–22.

A significant benefit to developers is that the bandsite 120 handles all sizing and ordering/layout issues for the band objects or deskbands 130. The bandsite 120 is aware of band object preferences, such as minimum/maximum size and whether the band title is visible. Another benefit is the deskbar 110 handles screen negotiation and allows the user to resize or alter entire sets of deskbars. This allows users to set preferences like autohide and always-on-top. The deskbar architecture also makes it easy for developers to have their band objects displayed in a context menu, which makes it easy for end users to add the band object to a deskbar.

IMPLEMENTATION OF DESKBARS

As previously mentioned, the present invention is embodied in the "INTERNET EXPLORER" application program, which runs on Microsoft Corporation's "WINDOWS 95" or "WINDOWS NT" operating systems. This embodiment employs several features that are commonly associated with such operating systems, such as a system registry, a rebar control, windows messages, and OLE interfaces and methods. During the boot operation, the deskbar site accesses a system registry to obtain information about deskbars and bandsites. The registry is a system-wide database used for a variety of purposes, including system configuration, user information, and common object model (COM) and ActiveX configuration. Deskbar and bandsite information obtained from the registry includes position, size, contents, and so forth. The deskbar site then creates the deskbar and bandsite (e.g., by calling an OLE method, CoCreateInstance (CLSID . . . )), which creates an instance of an object identified by the class identification. The information obtained from the registry also indicates which band objects, such as deskbands, are located on the deskbars.

The bandsite is implemented by a rebar control, which is a standard Win32 window control residing in COMCTL32.DLL. The rebar control acts as a container for child windows, which are often other controls that are assigned to a rebar control band. The rebar control manages the size and position of child windows that are assigned to that rebar control band. The bandsite uses methods from OLE's IPersistStream interface, such as IPersistStreamInit::InitNew, IPersiststream::Save, and IPersistStream: :Load, to allow the bland object, namely the deskband, to read and write its information from a single stream and to allow the band object to load any persistent information that it needs to set up its initial state. Specifically, the InitNew member function initializes the band object after creation, thereby giving the object an opportunity to set its initial state. The Load member function instructs the band object to load its state from the current seek offset of the given stream. In response to use of the IPersistStream interface, the band object reads and writes its information from the stream to set up its initial state.

The bandsite then employs a SetSite method, such as IOleObjectWithSite::SetSite, to set the band object's site. The SetSite method is called on when the band object is created. The SetSite method allows the band object to request the handle of a parent window using OLE's IOleWindow interface, which is a common base interface representing operations that are common to all parts of a container. For example, one common operation is a GetWindow operation, which returns the handle (hwnd) of the window associated with whatever band object is attached to the IOleWindow interface. The bandsite places the child window's handle into the rebar control, which sizes the child window before displaying it. In response to use of the SetSite method, the band object caches its pointer to an interface on the bandsite and asks for the bandsite's handle, i.e. the identity of the parent window.

The bandsite and the deskband determine the band object preferences, such as size, shape, vertical or horizontal orientation, and so forth, by calling the IDeskBand::GetBandInfo method. These band object preferences are passed into the GetBandInfo member function. The band object creates the child window by loading the band object preferences into its information structure. At this stage, the child window is hidden. The bandsite calls the IDeskBand::ShowDW( . . . ) method to make the band object visible. In response, the deskband then creates and displays its window on the display screen. An example of the steps performed by each component and their sequence is represented in Table 1 below:

TABLE 1

Program/OS Initialization

| DESKBAR SITE | DESKBAR | BANDSITE | BAND OBJECT |
|---|---|---|---|
| (e.g., desktop browser, application, operating system shell, etc.) Access Registry to obtain info about deskbars & bandsites (position, size, band object, etc.) Create Deskbar/Bandsite (CoCreateInstance( CLSID. . .) | | | |
| | | [implemented using REBAR control] | |
| | | Obtain info from band object (IPersistStre am::Load(. . .)) | |
| | | | Read initial state from stream |
| | | Set Band Object's Site (IObjectWithS ite::SetSite( . . .)) | |
| | | | Cache pointer to interface on bandsite; ask for bandsite's handle (parent window) |
| | | Implement IOleWindow:: GetWindow (hwnd) to obtain child window handle; place child window handle into rebar control Determine Band Object Preferences (IDeskBand::G etBandInfo(. . .)) Tell band object horizontal or vertical orientation, order, and layout | Tell bandsite size, shape, etc.; fill in band object information into information structure; create child window (hidden) |
| | | Display Band Object (IDeskBand::S howDW(. . .)) | |
| | | | Create and display child window |
| | | REPEAT FOR ADDITIONAL BAND OBJECTS | |

When deskbands are manipulated, for example, by moving a deskband from a source bandsite to a target bandsite, the operation is preferably carried out by an OLE Drag and Drop method. It will be appreciated by those skilled in the art that the present invention is not limited to manipulating deskbands using OLE Drag and Drop, but may also employ other methods of manipulating band objects. A source bandsite creates a data object for OLE, using IDataObject, during the dragging process. OLE obtains the data object and drops the data object on the target bandsite. The target bandsite obtains data object information from OLE. The target bandsite obtains information from the band object. The target bandsite sets the band object's site and displays the band object. The target bandsite determines the band object preferences. The band object responds in a manner similar to the process previously described with respect to the boot up operation. An example of this process is represented in Table 2 below:

TABLE 2

Drag and Drop

| SOURCE BANDSITE | OLE | TARGET BANDSITE | BAND OBJECT |
|---|---|---|---|
| Create Data Object for OLE (using IDataObject) | | | |
| | Drop on Target Bandsite | | |
| | | Obtain Data Object info from OLE Obtain info from band object [IPersistStream::Load(. . .) | |
| | | | Read initial state from stream |
| | | Set Band Object's Site (IObjectWithSite::SetSite(. . .)) | |
| | | | Cache pointer to interface on bandsite; ask for bandsite's handle(parent window) |
| | | Implement IOleWindow::GetWindow (hwnd) to obtain parent window handle; place parent window handle into rebar control Determine Band Object Preferences (IDeskBand::GetBandInfo(. . .)) Tell band object horizontal or vertical orientation, order, and layout | Tell bandsite size, shape, etc.; fill in band object information into information structure; create child window (hidden) |
| | | Display Band Object (IDeskBand::ShowDW(. . .)) | |
| | | | Create and display child window |

The present invention also provides context menu support, which can be used to turn off and on various band objects, such as toolbars, to display or hide a band title associated with a band object, to handle layout issues, and so forth. A context menu message is sent from the operating system or browser to a band object when the band object is selected, for example by clicking on the band object using a mouse. Typically, a band object can implement its own context menu in response to the context menu message (e.g., WM_ContextMenu). Alternatively, a band object can implement an IContextMenu interface and, instead of responding to the context menu itself, the band object can pass the message along to the bandsite and let the bandsite manage the context menu. In this scenario, the IContextMenu interface allows the bandsite to ask the band object to merge the items that would be included in the band object's context menu with the items in the bandsite's context menu. The bandsite queries the band object for the IContextMenu interface after it receives the WM_ContextMenu message. One advantage of allowing the bandsite to handle the context menu using the IContextMenu interface is a band implementer is given more control and creative freedom over context menu support. For example, the band implementer can create a band object and have it displayed in the context menu.

An embodiment of the present invention also employs OLE's IInputObject interface, which allows a band object to accept user input. In version 4.0 of the "INTERNET EXPLORER" application program 37 (FIG. 1), the container uses IInputObject and implements IInputObjectSite to maintain proper user input focus when more than one contained window exists. For example, when a user presses a Tab button on a keyboard, focus goes to the first band object that accepts focus on the deskbar. The band object accepts focus by implementing the IInputObject interface. The bandsite is responsible for determining which band object currently has focus and gives focus to each band object each time the Tab button is pressed. After all of the band objects in one deskbar have been tabbed through, the deskbar site gives focus to the next deskbar to repeat the process of giving focus to the band objects therein. This process is repeated for each deskbar.

In summary, the present invention provides a flexible architecture that allows a user to directly access key commands and functionality in a context-insensitive manner. In addition, this architecture serves as a platform for developers and allows them to provide deskbars and deskbands in any application program or browser without having to design every intricate implementation detail. Whereas, at one time, the developer had to design every component or feature that the developer needed to provide specific functionality, the developer now is able to plug into this architecture through the, architecture's external interfaces to access the features provided without having to develop these specific features and without having to know the architecture's internal implementation details that provide these features.

Figure 3:
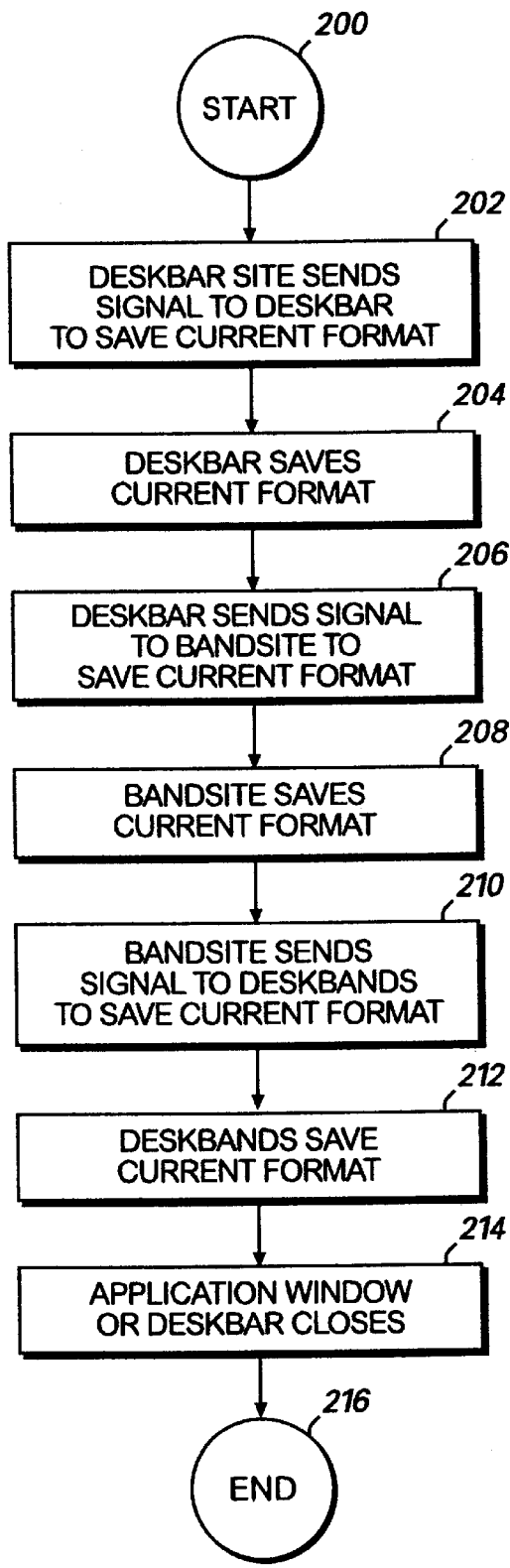
FIG. 3 is a flow diagram illustrating a method for saving a deskbar in accordance with an embodiment of the present invention.

When a deskbar is closed, the configuration of the deskbar is saved so that the user does not have to recustomize the deskbar when it is reopened. FIG. 3 is a flow diagram illustrating an exemplary process for saving a deskbar. The process begins at the START step 200 when a user-provided input signal indicates that a deskbar or an application window containing a deskbar should be closed.

In step 202, before the application window or deskbar is closed, the deskbar site sends a signal to the deskbar and instructs the deskbar to save its current format to the registry. Next, the deskbar saves its current format (step 204) to the registry. In step 206, the deskbar sends a signal to the bandsite and instructs the bandsite to save its current format to the registry. The bandsite, in turn, performs the step of saving its current format (step 208) to the registry. Next, in step 210, the bandsite sends a signal to all deskbands that are contained within the bandsite and instructs them to save themselves to the registry in their current format. In step 212, each deskband within the bandsite performs the step of saving its current format to the registry. Next, in step 214, a signal is sent from the deskbands, the bandsite, and the deskbar to the deskbar site indicating that the current formats are saved, and the application window or deskbar is closed. The process terminates at the END step 216.

USER OPERATION AND BENEFITS

With continuing reference to FIGS. 1–3 and now turning to FIGS. 4–21, the creation, customization, and functionality of a deskbar are described.

FIGS. 4–8 depict screen displays that illustrate an exemplary process by which a user can customize a deskbar. As previously mentioned, the deskbar site, such as an application program, a desktop browser, or any type of operating system shell, includes low level code that creates the deskbar and deskband. The deskbar is the component that interacts with the deskbar site to negotiate for space on the display screen. Each deskbar contains a single component, a bandsite, which hosts and manages deskbands by manipulating the position and size of the deskbands.

FIGS. 4a and 4b are partial screen displays depicting a deskbar and associated menus, which are displayed on the monitor 47 (FIG. 1). In FIG. 4a, a display screen 300 displays a desktop 301 associated with a deskbar-enabled operating system. The desktop 301 serves as the location for the deskbar 310, which is located at the bottom of the display screen 300. This deskbar 310 is also known as a taskbar, and it is a permanent part of the "WINDOWS 95" desktop 301. Although the deskbar 310 resembles taskbars in the prior art, such as the taskbar associated with the "WINDOWS 95" application program, the deskbar 310 has additional features and performs functions that are not common to prior art taskbars.

The deskbar 310 includes a start icon 315 that displays user options (not shown) using cascading menus. The cascading menus include a list of available commands and/or application programs stored in on the hard drive 27 (FIG. 1) of the computer 20 (FIG. 1).

The deskbar 310 also includes a section 319 for containing application icons 320 that are associated with application programs that are currently open. Specifically, whenever there is an open application program, an associated icon appears in the section 319 on the deskbar 310. By clicking on the application icon 320 using the mouse 42, the associated application program becomes active (not shown). When the application program is closed, the associated icon disappears from the section 319. The section 319 is only associated with taskbar-like deskbar and cannot be removed even if there are no icons contained within it. In contrast, there are no permanently associated sections or deskbands in connection with other deskbars that may be created. Moreover, when the only deskband in a deskbar, other than a taskbar-like deskbar, is removed or closed, the deskbar disappears from the display screen.

In FIG. 4a, the user can customize the deskbar 310 by adding deskbands to the deskbar 310. One way to add deskbands is by utilizing a context menu 325 associated with the deskbar 310. A second method of adding deskbands to the deskbar will be described in greater detail below in connection with FIGS. 19 and 20.

To open the context menu 325, the user can either move a cursor (not shown) over an empty area of the deskbar 310, i.e., where an icon or other component cannot be mistakenly selected, or over a header 321, which can be a deskband title (not shown) or a double-lined raised edge on the deskbar 310. Typically, when the cursor is moved over the header 321, the appearance of the cursor changes to a double-headed arrow or a hand. When the cursor is positioned over the empty area or the header, the user clicks the right mouse button to open the context menu 325, and the context menu 325 appears on the display screen 300. The context menu 325 includes a list of commands 326. Of particular interest is a toolbar command 327, which triggers a sub-menu 335, as shown in FIG. 4b.

Referring to FIG. 4b, the sub-menu 335 is displayed by selecting the toolbar command 327 using the mouse 42. The sub-menu 335 includes a list of "registered" toolbar options 340a–340d and a new toolbar option 340e. In this example, the registered toolbar options include an address toolbar option 340a, a links toolbar option 340b, a desktop toolbar option 340c, and a quick launch toolbar option 340d. These toolbar options 340a–340d are associated with an address toolbar, a links toolbar, a desktop toolbar, and a quick launch toolbar, respectively. The address toolbar allows the user to enter a Web address to open a Web page without having to open the web browser application program 37 (FIG. 1). The links toolbar provides links to important Web sites without having to open the web browser application program 37 (FIG. 1). The desktop toolbar contains icons on the desktop and organizes the icons in one convenient location. The quick launch toolbar contains icons to start any of the application programs that have been assigned to the toolbar. These toolbars are "registered" within the sub-menu 335.

This means that the toolbar appears in the sub-menu 335 and is directly accessible from the sub-menu 335. It will be appreciated by those skilled in the art that the present invention is not limited to the referenced registered deskbands, but can also include other deskbands. As previously mentioned, a band implementer can create a band object and have it displayed in the sub-menu 335.

The sub-menu 335 also includes a new toolbar option 340e for selecting an unregistered toolbar or toolbar component from other application programs or folders in the system memory 22. If the user desires to add an unregistered deskband to the deskbar 310, the user selects the new toolbar option 340e using the mouse 42. Once the new toolbar option 340e has been selected, a dialog box 400, as illustrated in FIG. 5, is displayed on the display screen 300.

Figure 5:
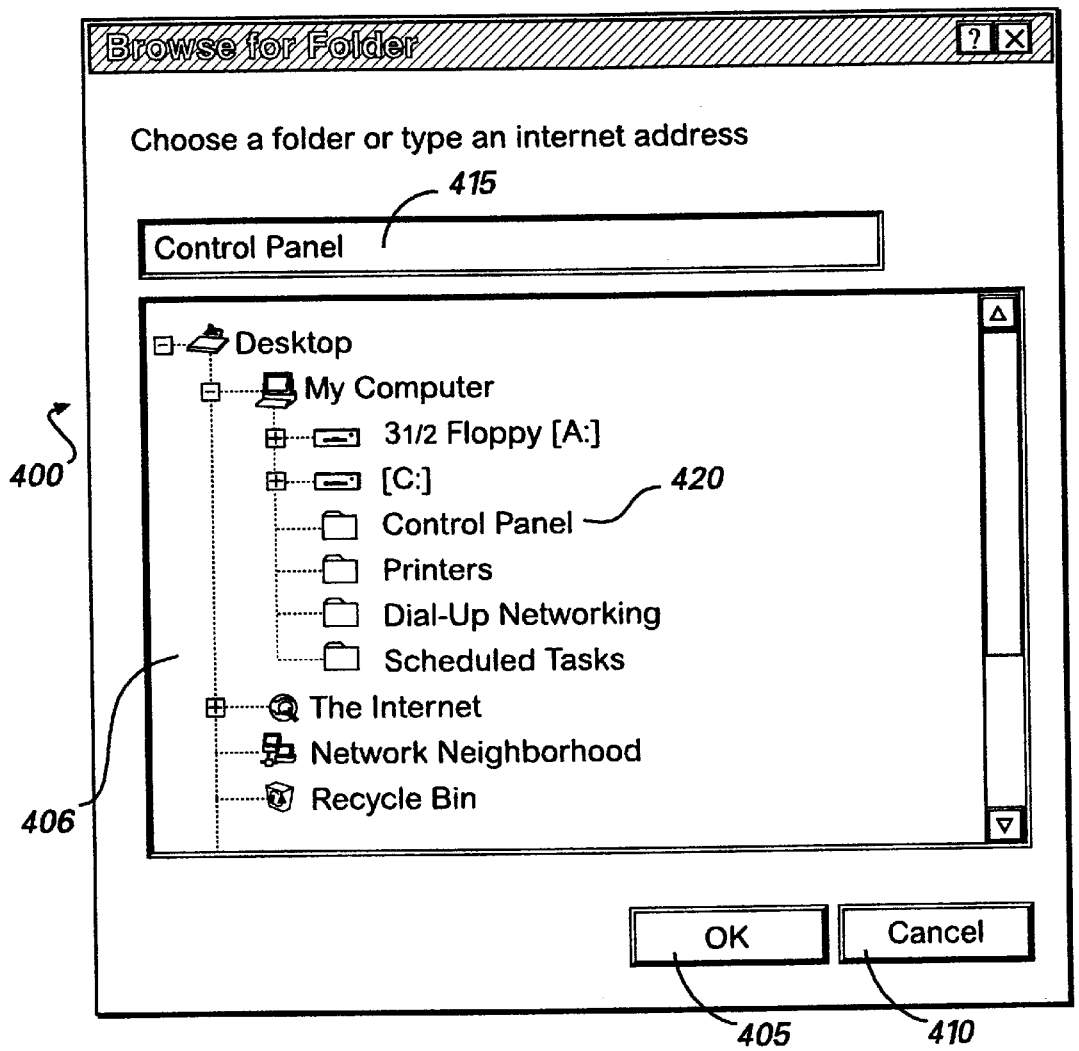
FIG. 5 illustrates a dialog box in accordance with an embodiment of the present invention.

Now turning to FIG. 5, a "Browse for Folder" dialog box 400 is illustrated in accordance with an embodiment of the present invention. The dialog box 400 contains folders 406 for various application programs, system functions, and control items that are stored in the system memory 22.

If the user desires to add a deskband associated with one of the folders 406, for example, a control panel folder 420, the user clicks on control panel folder 420 using the mouse 42 (FIG. 1). The name of the folder "Control Panel" appears in a window 415 provided in the dialog box 400. The user then clicks on an "OK" button 405 to select the control panel folder 420. The user has the option of canceling the selection by clicking on a "Cancel" button 410.

FIG. 6 illustrates a deskbar 310 containing a control panel toolbar in accordance with an embodiment of the present invention. Once the user has selected the control panel folder 420, the associated control panel toolbar 500 containing icons 505 for the items contained within the control panel folder 420 is displayed in the deskbar 310 on the display screen 300. The control panel toolbar 500 is displayed in an expanded view. The application icon 320 is displayed in a collapsed view. It will be appreciated by those skilled in the art that the present invention is not limited to the selection of the control panel folder to create a deskband on the deskbar, but may also Include the selection of other folders and application programs containing toolbars.

Advantageously, the present invention provides the benefit of improving access to commands and information that a user needs. As previously mentioned, deskbars may be used to provide frequent (or immediate) access to a command or to information. For example, if a user often accesses files from a particular file share, the user can create a deskbar containing an object that represents the file share. When the deskbar is placed on the desktop or in the taskbar, it makes the task of opening the file much easier because the file share is always conveniently accessible. In addition, deskbars may be used to provide information or a command in a context-insensitive manner. For example, if the deskbar is on the desktop, it is accessible while the user is in almost any other application. This would make a deskbar an ideal container for a dictionary look-up feature so that the feature is available regardless of the particular application program the user is using at any given time (e.g., word processing, spreadsheet, email, web browser, etc.).

In FIG. 6, the icons 505 in the control panel toolbar 500 are small and may be difficult to view. The user may desire to increase the size of the icons 505 on the control panel 500 for easier visibility. To do so, the user moves the cursor over the control panel toolbar 500 such that it does not give focus to the icons 505 or over a header 501 of the control panel toolbar 500 and clicks on the control panel toolbar 500 using the right mouse button of the mouse 42. After clicking the mouse, a context menu 510 appears on the display screen 300, as shown in FIG. 7.

Now turning to FIG. 7, a portion of a screen display illustrating a deskbar having a control panel toolbar and associated context menu is shown in accordance with an exemplary embodiment of the present invention. The context menu 510 includes a view option 520 for opening a sub-menu 515, which contains a large option 516a and a small option 516b. These options change the size of the icons within the deskband. To view the icons 505 in a large format, the user selects the view option 520 and then selects the large option 516a using the mouse 42. In turn, the icons 505 for the control panel toolbar 500 are displayed in the large format in the deskbar 310. The icons 505 can be changed back to a small format by following a similar process as previously described, the difference being the selection of the small option 516b.

To add more deskbands to the deskbar 310, the user can use a process similar to that described above in connection with FIGS. 4–7. It will be appreciated by those skilled in the art that the present invention can include multiple toolbars or toolbar components on a single deskbar.

Figure 8A:
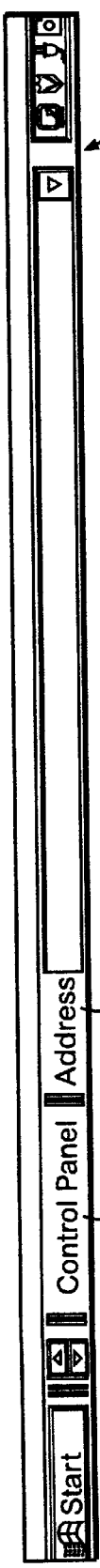
FIG. 8, consisting of FIGS. 8a–8e, illustrates various arrangements of a deskbar having registered deskbands and a control panel toolbar in accordance with an embodiment of the present invention.
Figure 8B:
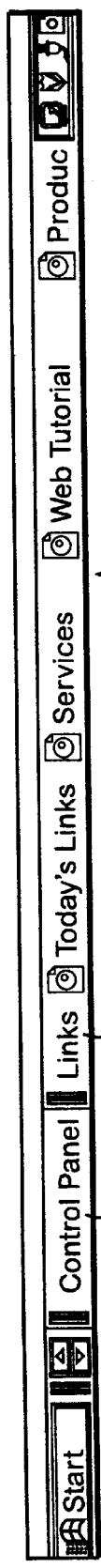
Figure 8C:
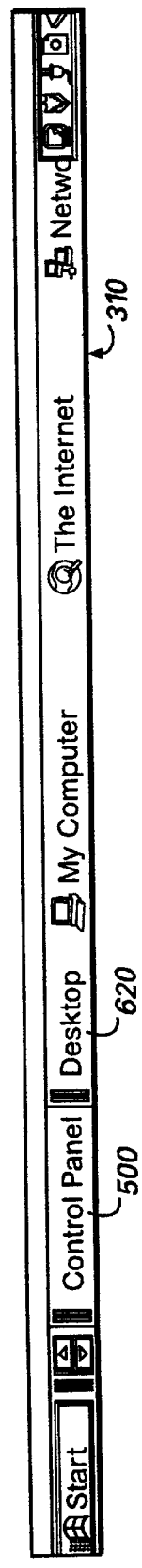
Figure 8D:
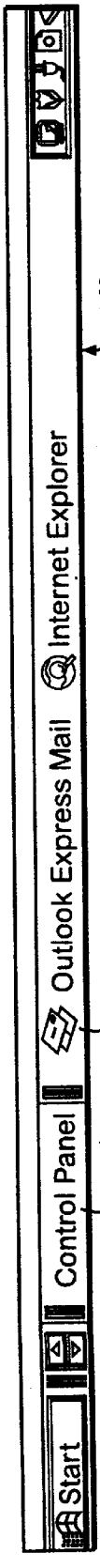

With continuing reference to FIGS. 4b and 6 and now turning to FIG. 8, consisting of FIGS. 8a–8e, various arrangements of a deskbar having registered and unregistered deskbands are illustrated in accordance with an exemplary embodiment of the present invention. The registered deskbands described above in connection with FIG. 4b are selected by simply clicking on the toolbar options 340a–340e in the sub-menu 335 (FIG. 4b). Once a registered toolbar option is selected, the associated toolbar is immediately displayed in the deskbar 310. For example, FIG. 8a illustrates the deskbar 310 containing an address bar 600, which is displayed when the address toolbar option 340a (FIG. 4b) is selected. FIG. 8b illustrates the deskbar 310 containing a links toolbar 610, which is displayed when the links toolbar option 340b is selected. FIG. 8c illustrates a deskbar 310 containing a desktop toolbar 620, which is displayed when the desktop toolbar option 340c is selected. FIG. 8d illustrates the deskbar 310 containing a quick launch toolbar 630, which is displayed when the quick launch toolbar option 340d is selected. FIGS. 8a–8d show the registered deskbands in a fully expanded view, and the control panel toolbar 500 in a collapsed view. This arrangement is only due to the order in which the deskbands are selected. In other words, if the control panel toolbar 500 is selected last and there is available space on the deskbar 310, the control panel toolbar 500 would appear in a fully expanded view, while any other deskband would be displayed in a collapsed view.

FIG. 8e illustrates the deskbar 310 containing multiple deskbands, namely, the quick launch toolbar 630, the control panel toolbar 500, the links toolbar 610, the desktop toolbar 620, and the address toolbar 600. It will be appreciated by those skilled in the art that the deskbar can be customized to include various combinations of deskbands and can also vary in the number of deskbands based on the user's needs.

If the deskbar 310 appears too cluttered, the user can create a new deskbar or close deskbands. To close a deskband, the user simply moves the cursor over a deskband, activates the context menu 510 and selects a close option 507 (FIG. 7). The deskband then disappears from the deskbar.

Each deskband can also exist as an independent deskbar. The creation of a new deskbar from an existing deskbar will be described in greater detail below in connection with FIGS. 9 and 10.

CREATING A NEW DESKBAR FROM AN EXISTING DESKBAR AND MANEUVERABILITY OF A DESKBAR

Generally, a new deskbar can be created by separating a deskband component or entire deskband associated with an application program from the application program. This separation is performed by dragging and dropping the deskband component or deskband using a pointing device, such as a mouse. The new deskbar that houses the component or toolbar is created automatically.

FIG. 9 is a screen display illustrating the process by which a user can create a new deskbar from an existing deskbar in accordance with an exemplary embodiment of the present invention. Generally described, this is accomplished by dragging a deskband from a deskbar to the desktop. Referring back to FIG. 8e, to create a separate deskbar from the existing deskbar 310, the user first positions the cursor (not shown) over a header 650 of one of the deskbands 500, 600, 610, 620, and 630. Once the cursor is in position, the appearance of the cursor changes (not shown) to indicate that the deskband chosen by the user can be altered or maneuvered. The user then presses the mouse button to select the deskband and drags the deskband away from the deskbar 310. A tiny box indicator (not shown) appears on the display screen 300 in place of the cursor during the dragging process to indicate that the deskband is being moved from the deskbar 310. When the mouse button is released, a new deskbar 700 appears on the display screen 300 containing the dragged deskband 630, as shown in FIG. 9.

Now turning to FIG. 9, for example, if the user desires to create a deskbar containing only the quick launch toolbar 630 (FIG. 8e), the user can select the quick launch toolbar 630 in the deskbar 310, as previously described, and drag it away from the deskbar 310. Once the mouse button is released, a separate deskbar 700 containing the quick launch toolbar 630 is created on the display screen 300, and the quick launch toolbar 630 no longer appears in the deskbar 310. The control panel toolbar 500, the links toolbar 610, the desktop toolbar 620, and the address toolbar 600 remain in the deskbar 310.

Figure 10A:
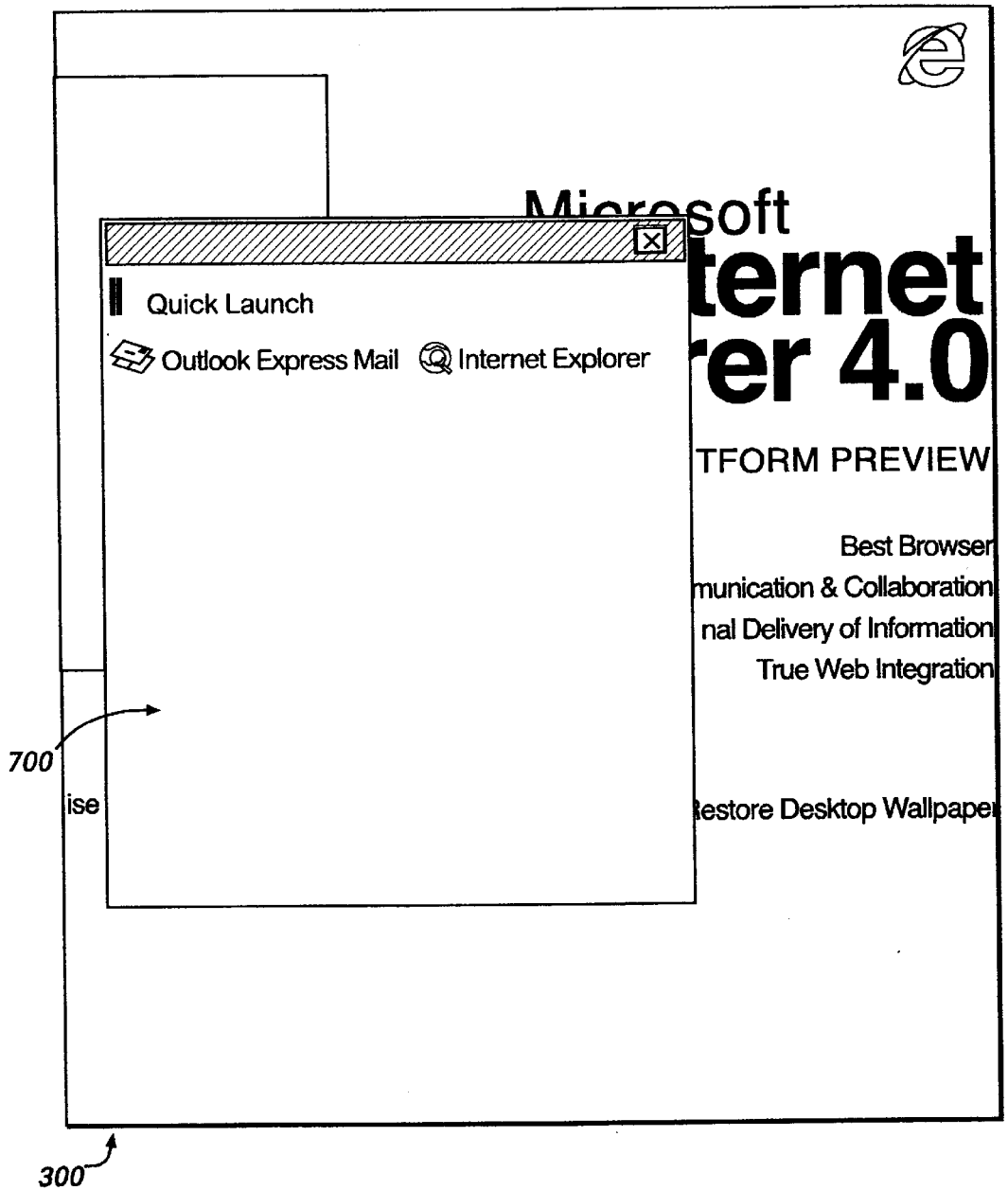
FIG. 10, consisting of FIGS. 10a–10c, illustrates the maneuverability of a deskbar.
Figure 10B:
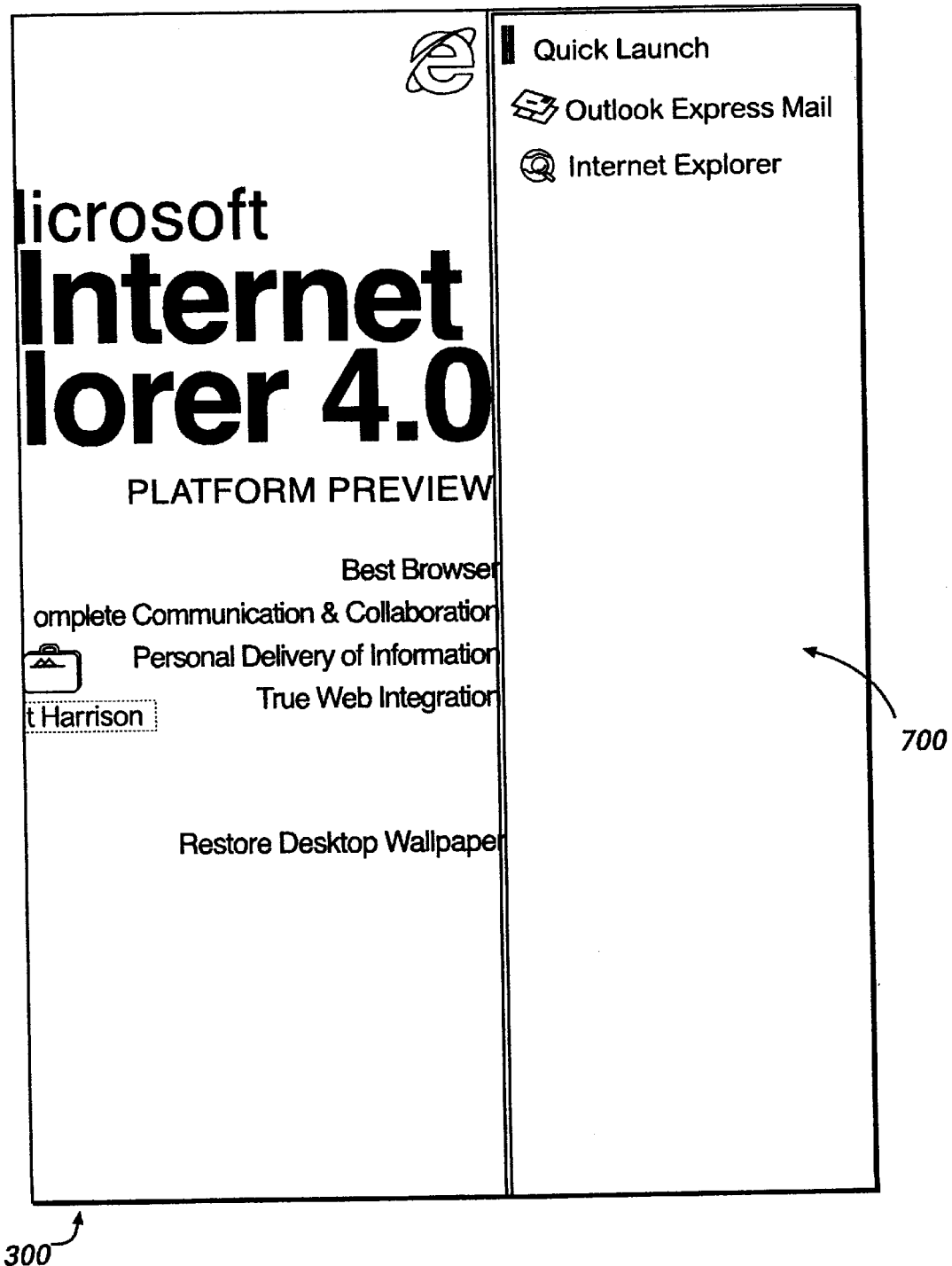
Figure 10C:
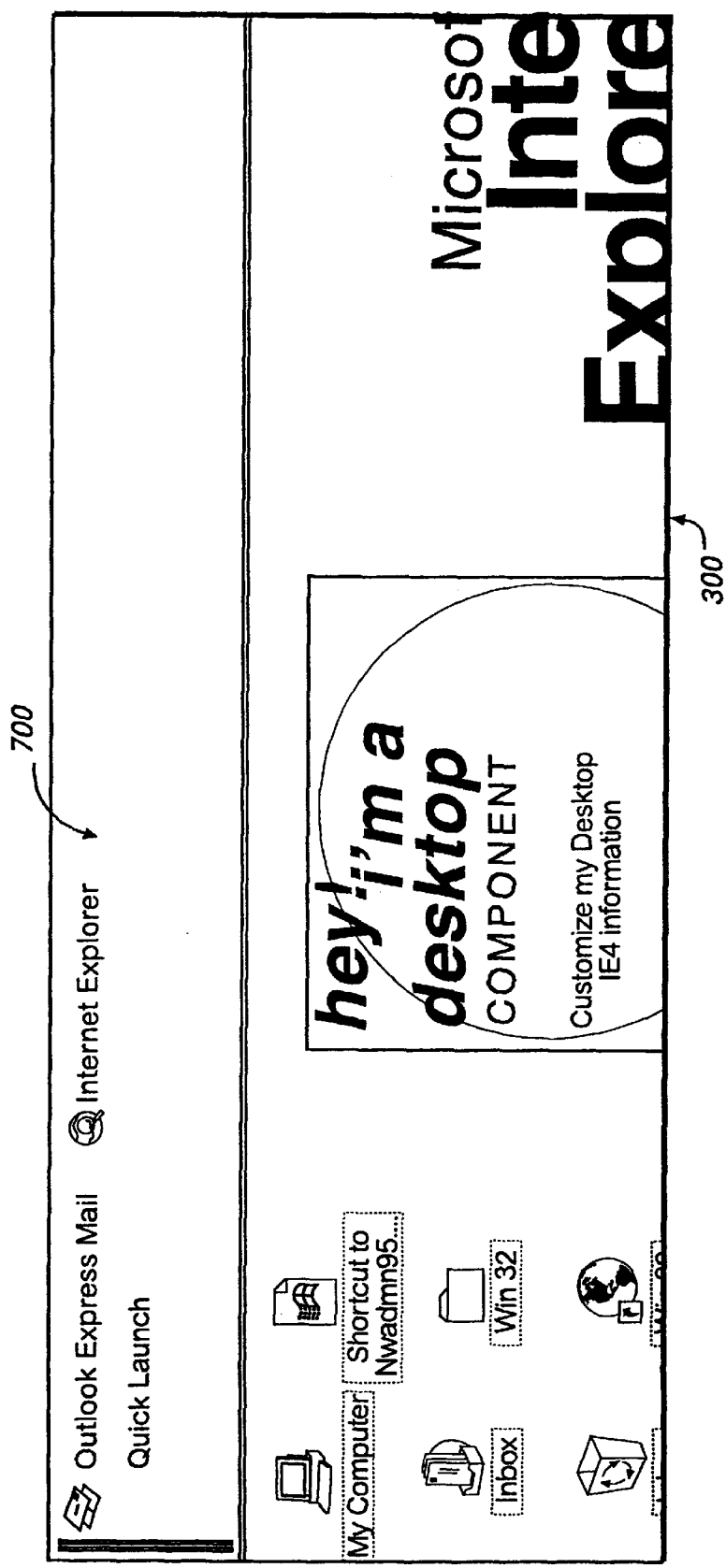

FIG. 10, consisting of FIGS. 10a–10c, illustrates the maneuverability of a deskbar. FIG. 10a represents an example of a floating deskbar 700 on the display screen 300. FIG. 10b represents an example of the same deskbar 700 maneuvered such that it is docked along a side edge of the display screen 300. FIG. 10c represents an example of the deskbar 700 maneuvered such that it is docked along a top edge of the display screen 300. The deskbar may also be maneuvered such that it is housed within an application window. The deskbar 700 is maneuvered via mouse 42 by drag and drop manipulation.

The deskbar 700 interacts with the deskbar site to negotiate for space on the display screen 300. If an application window is open, the deskbar site serves as the interface that allows the deskbar 700 to communicate with the application window. Hence, in a case where the deskbar 700 is located on an outer edge of the display screen, either top, bottom or sides, as shown in FIGS. 10b and 10c, an open application window is typically displayed such that it does not overlap the deskbar 700, and the deskbar 700 is preferably resized, if necessary, to accommodate the application window. However, in a case where the deskbar 700 is floating on the display screen 300, as shown in FIG. 10a, an open application window may overlap the deskbar 700.

RESIZING AND REARRANGING DESKBARS AND DESKBANDS

Figure 11:
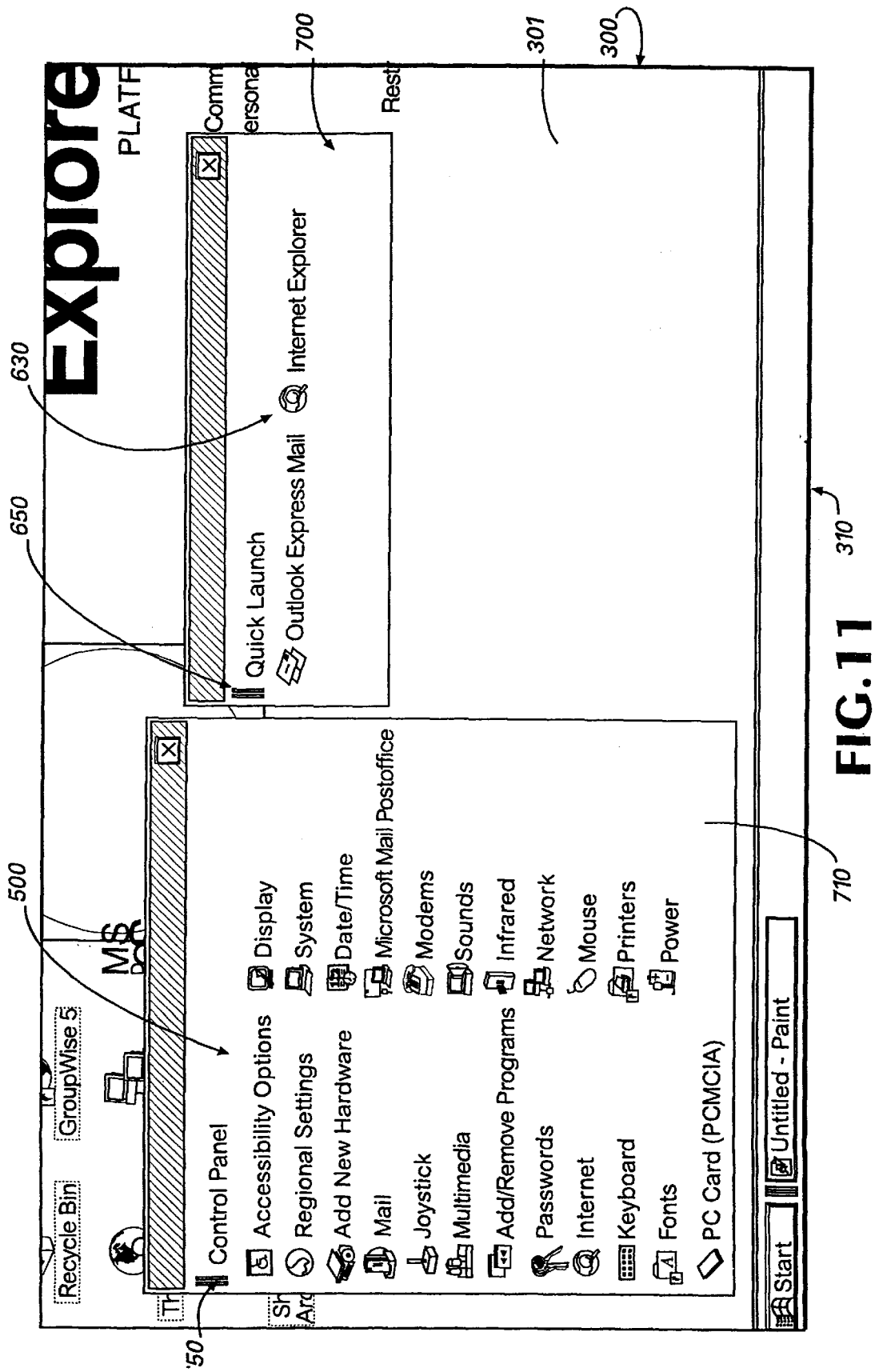
FIG. 11 is a screen display illustrating a desktop containing three deskbars, which include a taskbar and two floating deskbars.
Figure 12:
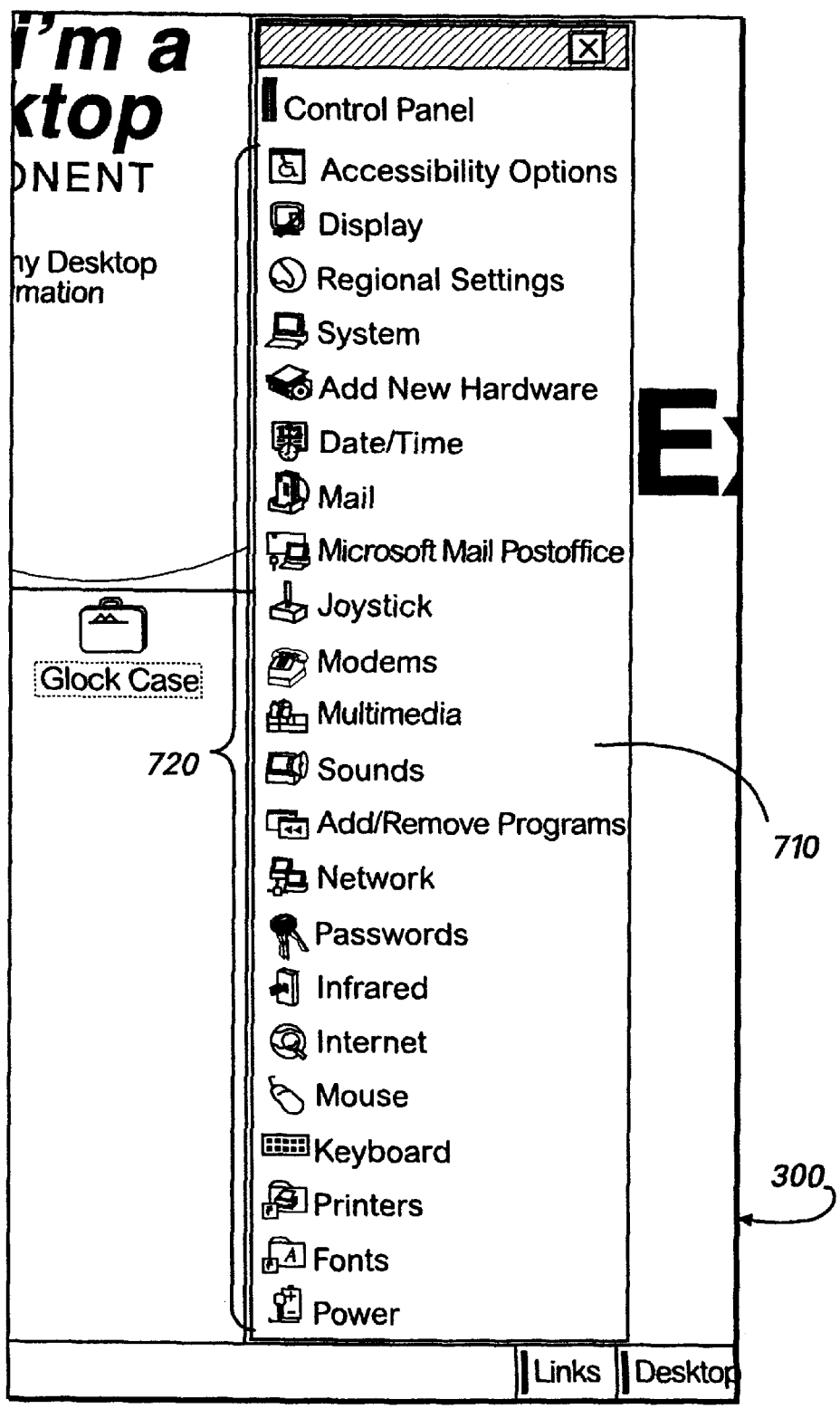
FIG. 12 illustrates a deskbar after being resized and the automatic rearrangement of icons due to resizing the deskbar.

FIG. 11 illustrates a method by which a user may rearrange deskbars. FIG. 11 is a display screen illustrating a desktop containing three deskbars, including a taskbar-like deskbar 310 and two floating deskbars 700, 710. A deskbar 710 is created using the same process as described with respect to FIGS. 8e and 9. If the user desires to create a deskbar containing only the control panel toolbar 500 (FIG. 8e), the user can select the control panel toolbar 500 in the deskbar 310 by using drag and drop manipulation. Specifically, the user can click on the header 650 using the mouse 42, as previously described in connection with FIG. 8e, and drag it away from the deskbar 310. Once the mouse button is released, a separate deskbar 710 containing the control panel toolbar 500 is created on the display screen 300, and the control panel toolbar 500 no longer appears in the deskbar 310.

The deskbars 700 and 710 may be resized according to the user's preference by direct on-screen manipulation using the mouse 42 (FIG. 1). The user simply clicks on an edge of the deskbar and drags the edge in the desired direction, that is, either upward or downward if a top or bottom edge is selected or sideways if a side edge is selected, to increase or decrease the size of the deskbar. As shown in FIG. 11, the size of the deskbar 700 is made smaller so that it takes up less display screen real-estate.

In addition, resizing the deskbar may result in automatic rearrangement of the deskband icons, which are managed by the bandsite 120 (FIG. 2). The bandsite 120 manages deskbands by manipulating the position and size of the deskbands. For example, in FIG. 12, the deskbar 710 is resized. Consequently, the icons 720 are automatically rearranged by the bandsite such that the icons 720 now appear in one row, as opposed to two rows as shown in FIG. 11.

Figure 13:
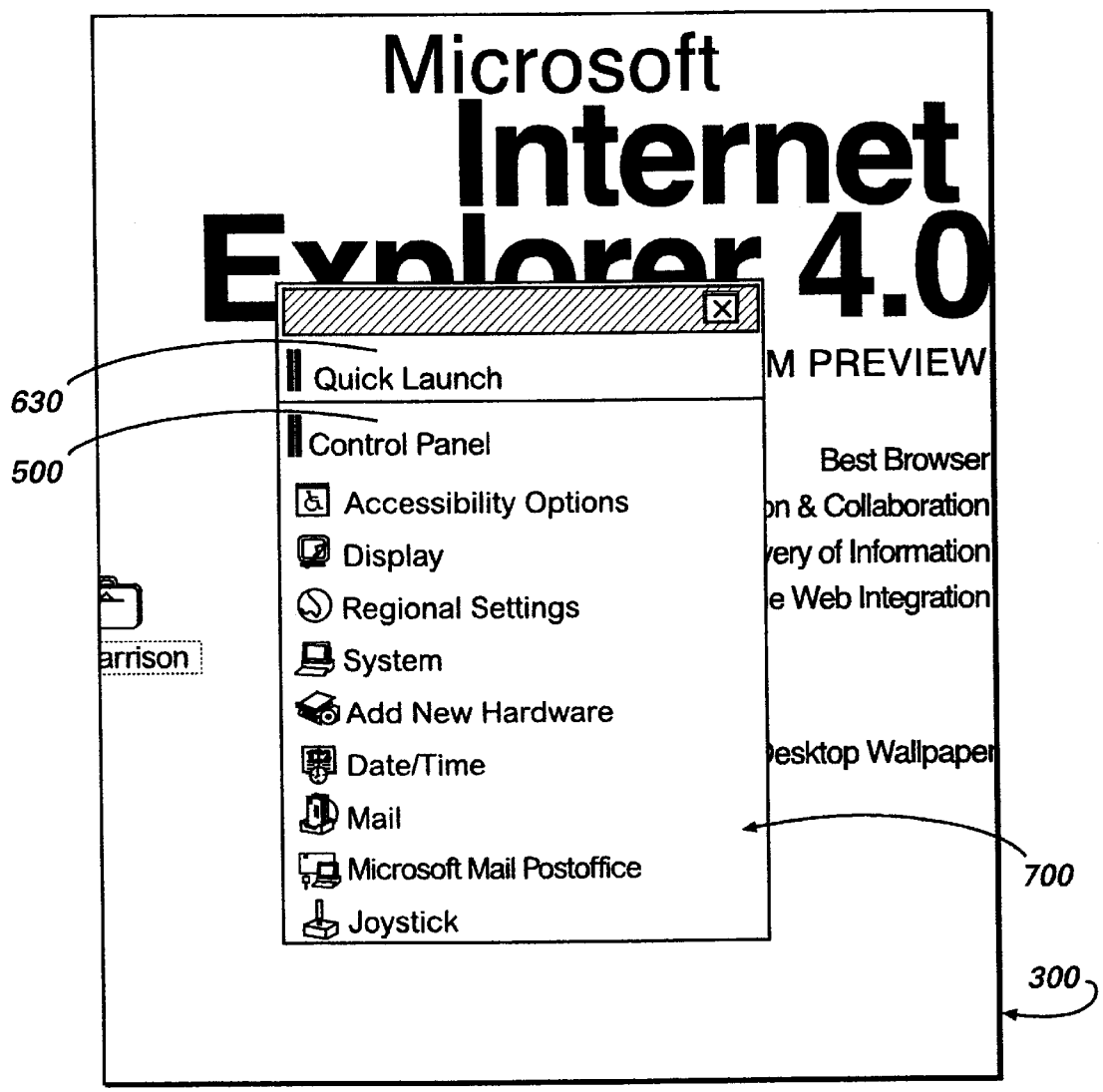
FIG. 13 is a screen display illustrating a result of combining a quick launch toolbar and a control panel toolbar.

Referring to FIG. 11, if the user desires to move a deskband from one deskbar to another deskbar, the user may do so by direct on-screen manipulation using the mouse 42. Specifically, the user can move the desired deskband by using drag and drop manipulation. For example, the user drags and drops the control panel toolbar 500 on the deskbar 700. As a result, the control panel toolbar 500 becomes a part of the deskbar 700, as illustrated in FIG. 13. Consequently, the deskbar 710 disappears because there are no other deskbands contained within its bandsite. The quick launch toolbar 630 is shown in a collapsed view and the control panel toolbar 500 is shown in an expanded view.

Figure 14:
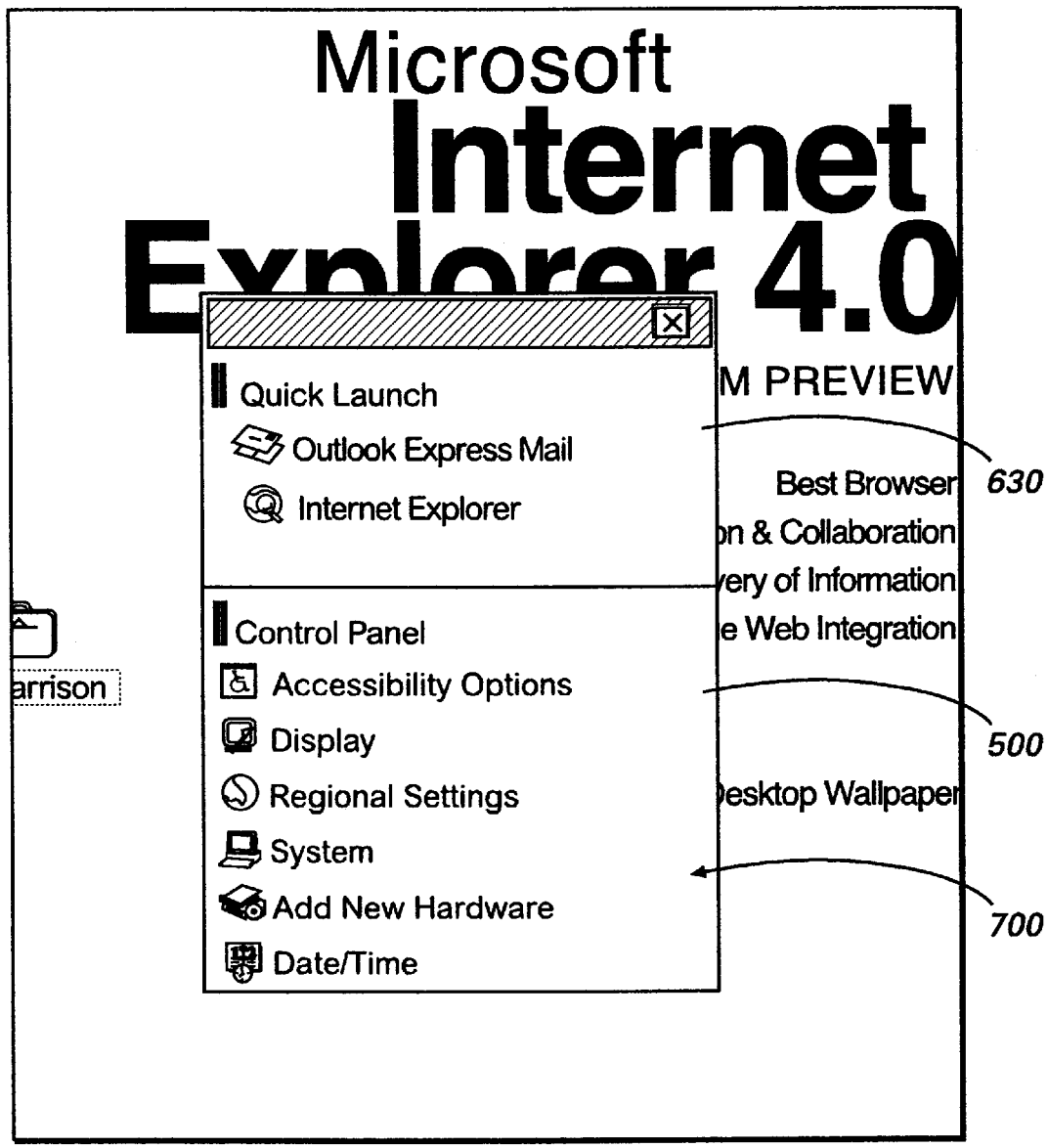
FIG. 14 illustrates overlapping and sliding features associated with a deskbar.

As a result of overlapping and sliding features associated with the deskbands, the user can slide any section horizontally or vertically, depending upon the arrangement of the deskbands, to see more or less of the section. For example, by moving the cursor over the header 650 of the control panel toolbar 500 and dragging the control panel toolbar 500 downward, the quick launch toolbar 630 becomes visible in the deskbar 700, as illustrated in FIG. 14. In addition, if the header 650 of the quick launch toolbar 630 is dragged downward, the quick launch toolbar 630 moves past the control panel toolbar 500 so that the control panel toolbar 500 is located at the top of the deskbar 700 (not shown).

Figure 15:
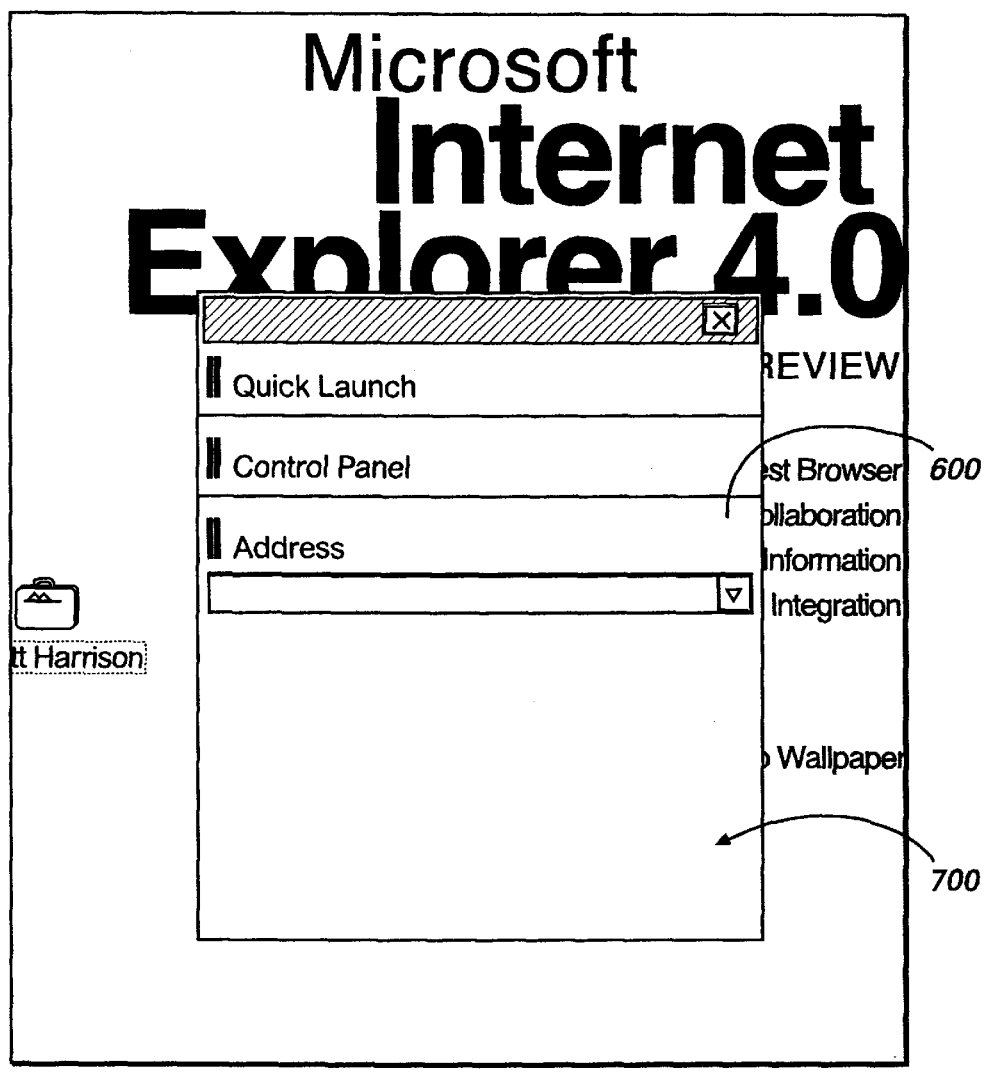
FIG. 15 illustrates a deskbar containing an address toolbar, a control panel toolbar, and a quick launch toolbar.
Figure 16:
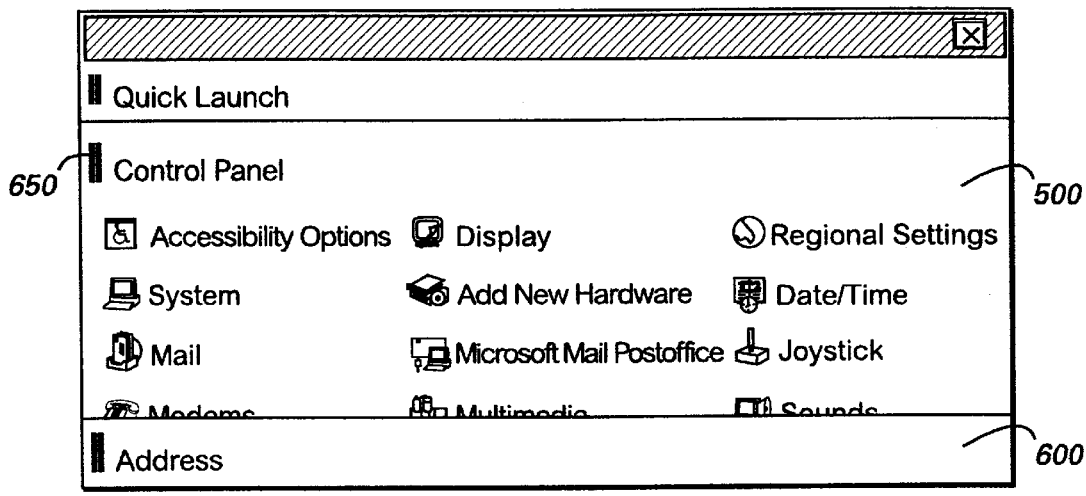
FIG. 16 illustrates the deskbar of FIG. 15 where a control panel toolbar has been expanded by directly clicking on a header of the control panel toolbar.

Other deskbands can be added to the deskbar 700 by dragging and dropping the deskbands as described with respect to FIGS. 8e and 9. For example, the user may desire to move the address toolbar 600 from the deskbar 310 to the deskbar 700 bet dragging and dropping the address toolbar 600 directly on the deskbar 700. FIG. 15 illustrates the deskbar 700 containing the address toolbar 600.

Instead of sliding deskbands to reveal the deskbands, the user can simply double click directly on a desired deskband to reveal it. This method applies to any section that is hidden behind another section and may be used to reveal the selected section. For example, in FIG. 16, if the user desires to view the control panel too bar 500 in an expanded view without using the sliding feature that was previously described, the user can simply move the cursor over the header 650 of the control panel toolbar 500 and click on the header 650. After the user clicks on the header 650, the control panel toolbar 500 is revealed. The control panel toolbar 500 appears in a fully expanded view, and the address toolbar 600 appears in a collapsed view, thereby producing the same result as the previously described sliding method.

FUNCTIONALITY OF A DESKBAND IN A DESKBAR

One advantage to creating and customizing a deskbar, as previously described with respect to FIGS. 4–16, is the convenience of utilizing toolbar components and toolbars at any time without the need for directly accessing or even activating the specific application program associated with the toolbar component or toolbar. In addition, a deskbar provides the benefit of being operable throughout deskbar-aware environments, such as an operating system or various application programs and their associated application windows.

Figure 17:
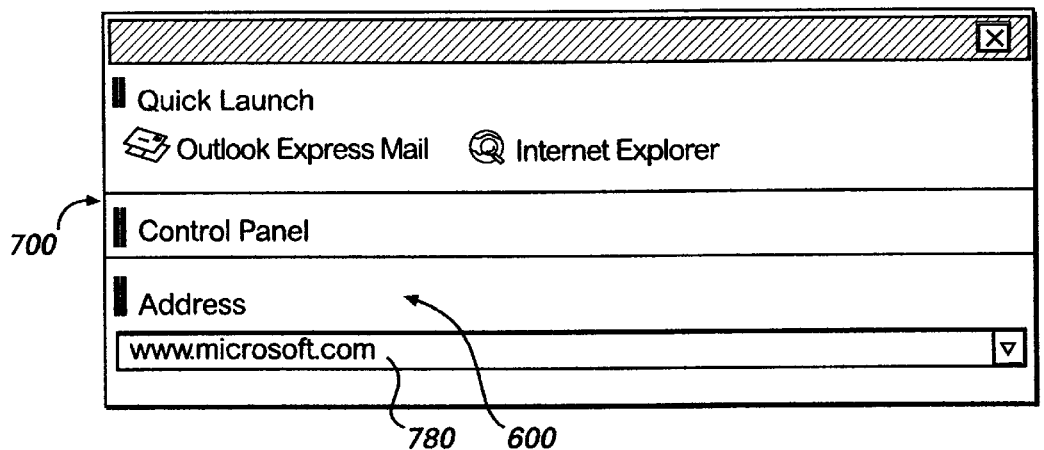
FIG. 17 illustrates an address toolbar in accordance with an embodiment of the present invention.

Referring to FIG. 17, a deskbar containing an address toolbar, which allows a user to enter a web page's uniform resource locator (URL), will be described in accordance with an embodiment of the present invention. After the deskbar 700 has been customized by the user, the user can use the icons and toolbars to perform their normal functions as if the associated application program were open. Those skilled in the art will appreciate that some icons may not have an associated function outside of the associated application program. Specifically, in FIG. 17, the user can enter a URL in a designated space 780 in the address toolbar 600 and open the associated Web page. For example, if the user enters the URL "http://www.microsoft.com" in the designated space 780 in the address toolbar 600, the web browser application program 37 (FIG. 1) begins to run and an associated application window automatically opens, as shown in FIG. 18.

Figure 18:
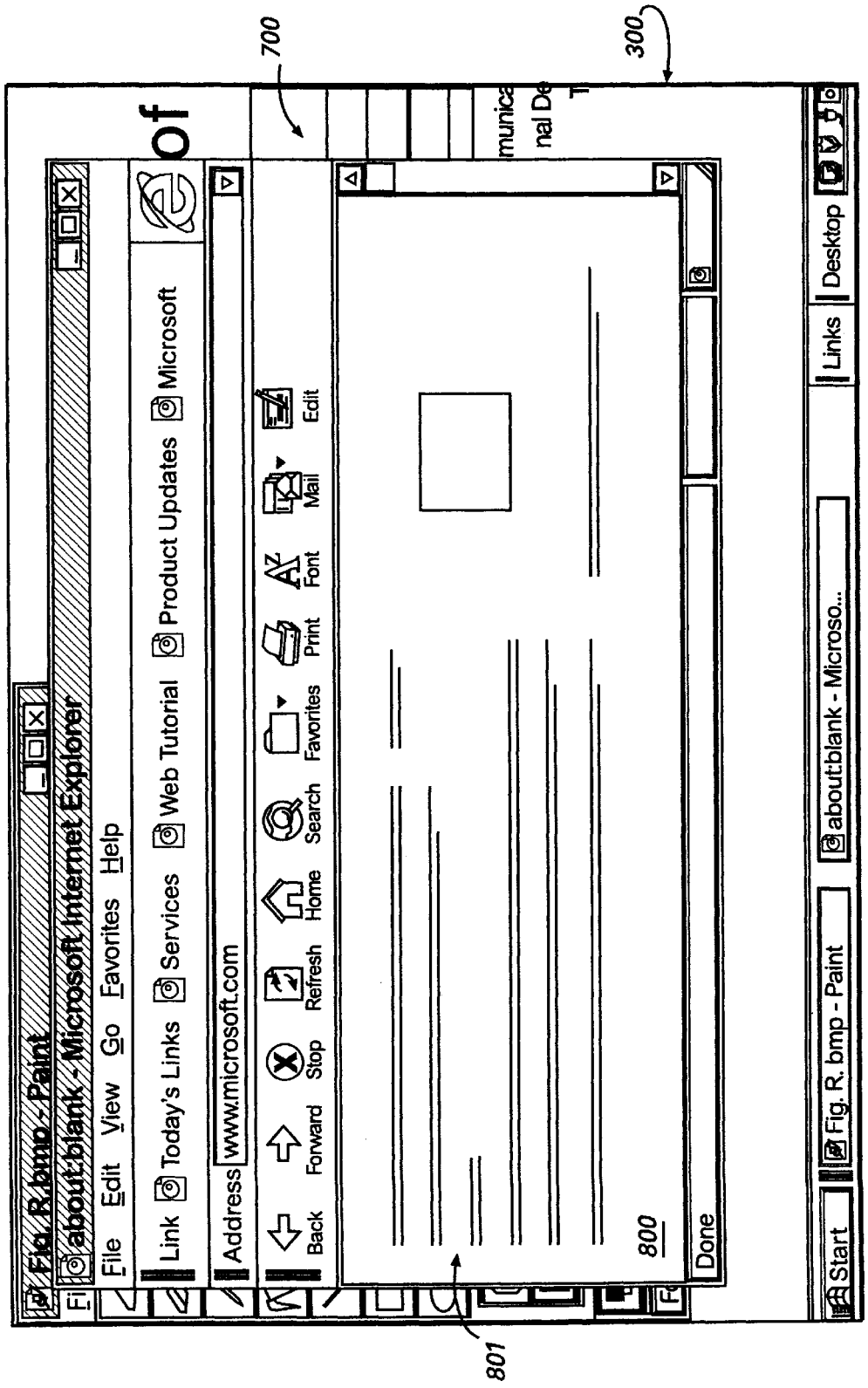
FIG. 18 is a screen display illustrating a web browser application window in accordance with an embodiment of the present invention.

In FIG. 18, the application window 800 contains a Web page 801 corresponding to the URL "http://www.microsoft.com." The user can then browse the Web page. When the user is finished browsing, the user can exit the web browser application program 37, in which case, the application window 800 closes. However, the deskbar 700 containing the address toolbar 600 remains on the display screen 300.

ALTERNATIVE METHODS FOR CREATING AND CUSTOMIZING A DESKBAR

With continuing reference to FIGS. 1–18 and now turning to FIGS. 19 and 20, alternative methods for creating and customizing a deskbar will be described.

Figure 19A:
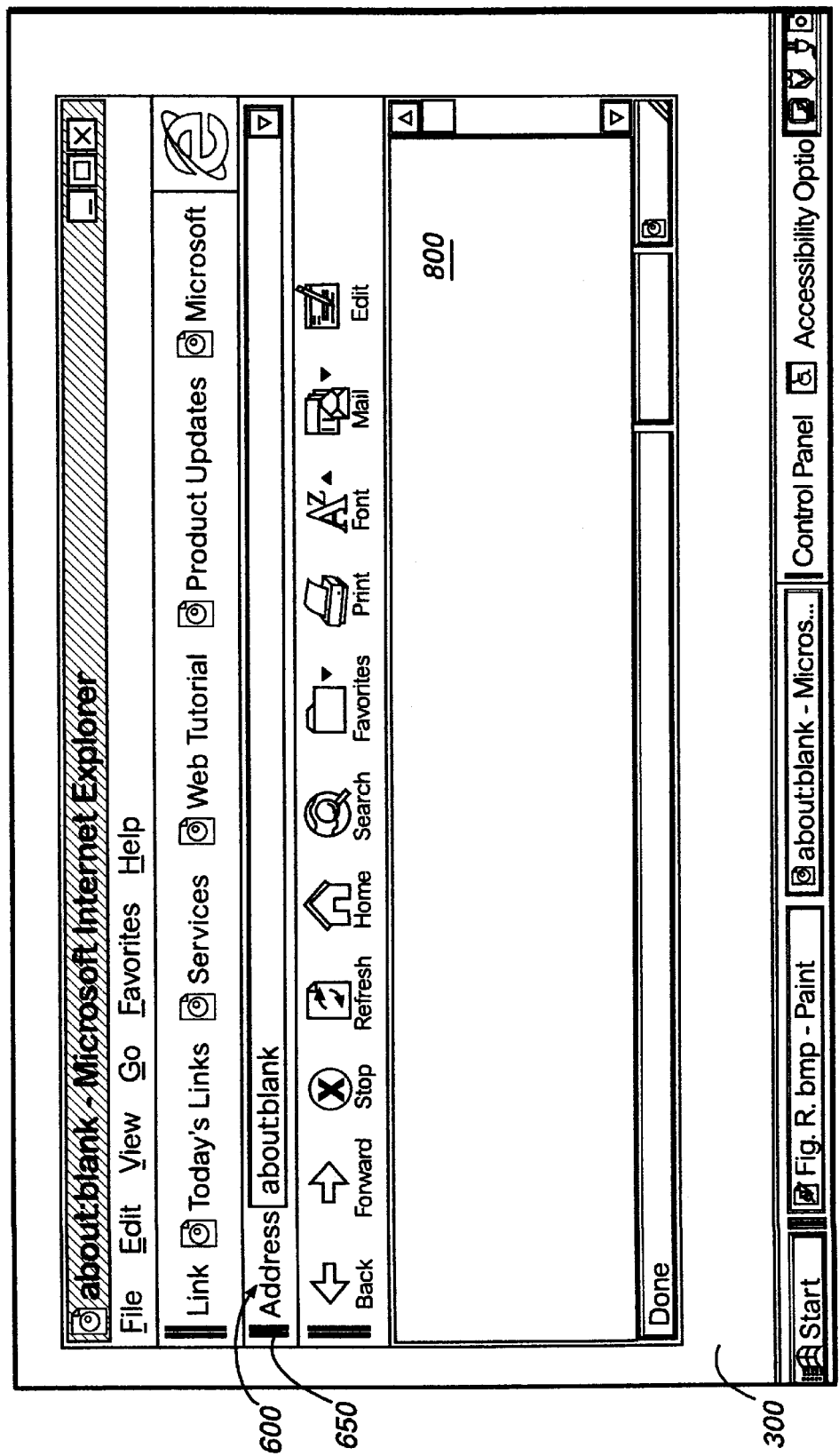
FIG. 19, consisting of FIGS. 19a–19c, depicts screen displays illustrating a method for creating a deskbar in accordance with an embodiment of the present invention.
Figure 19B:
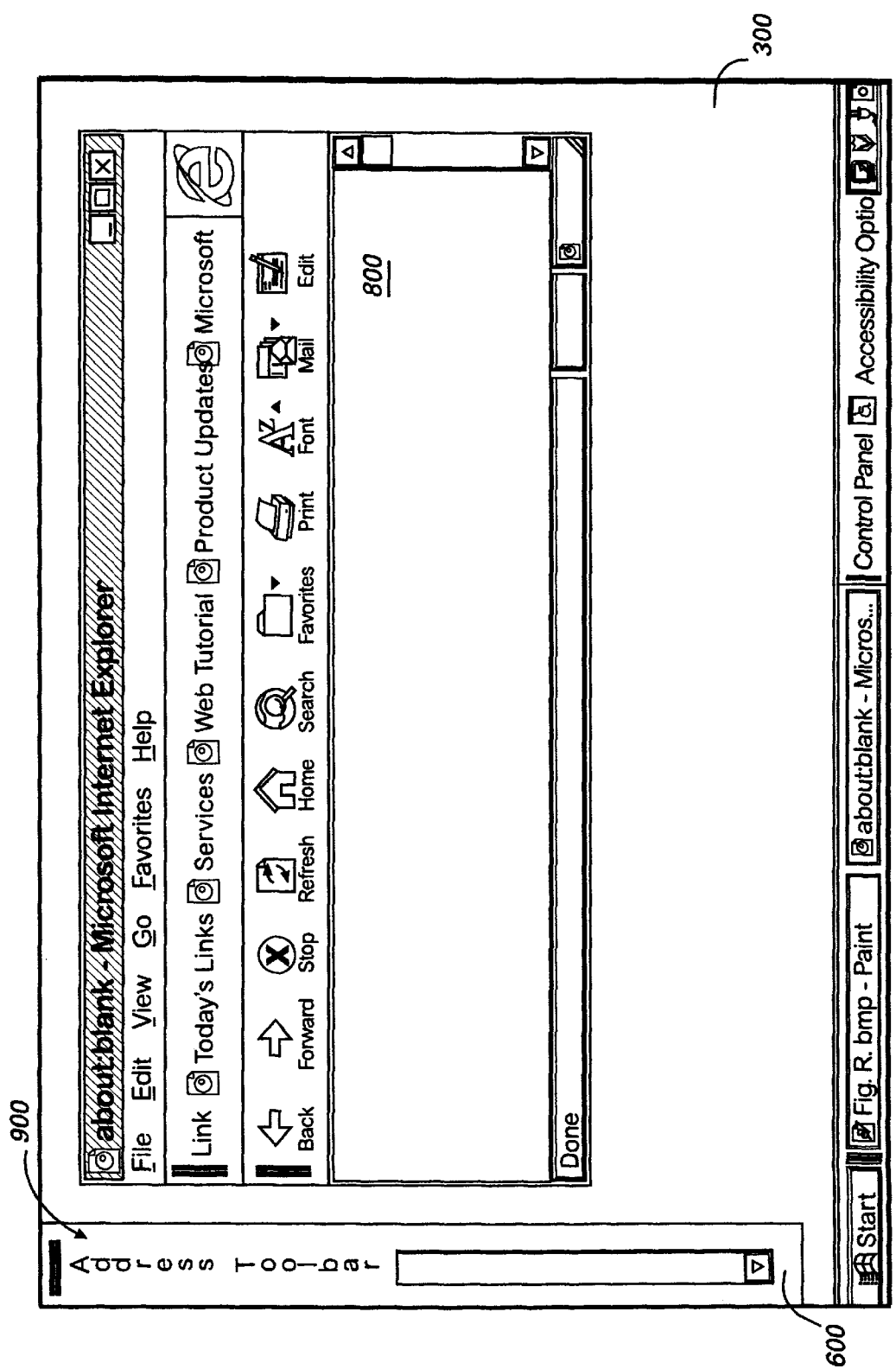
Figure 19C:
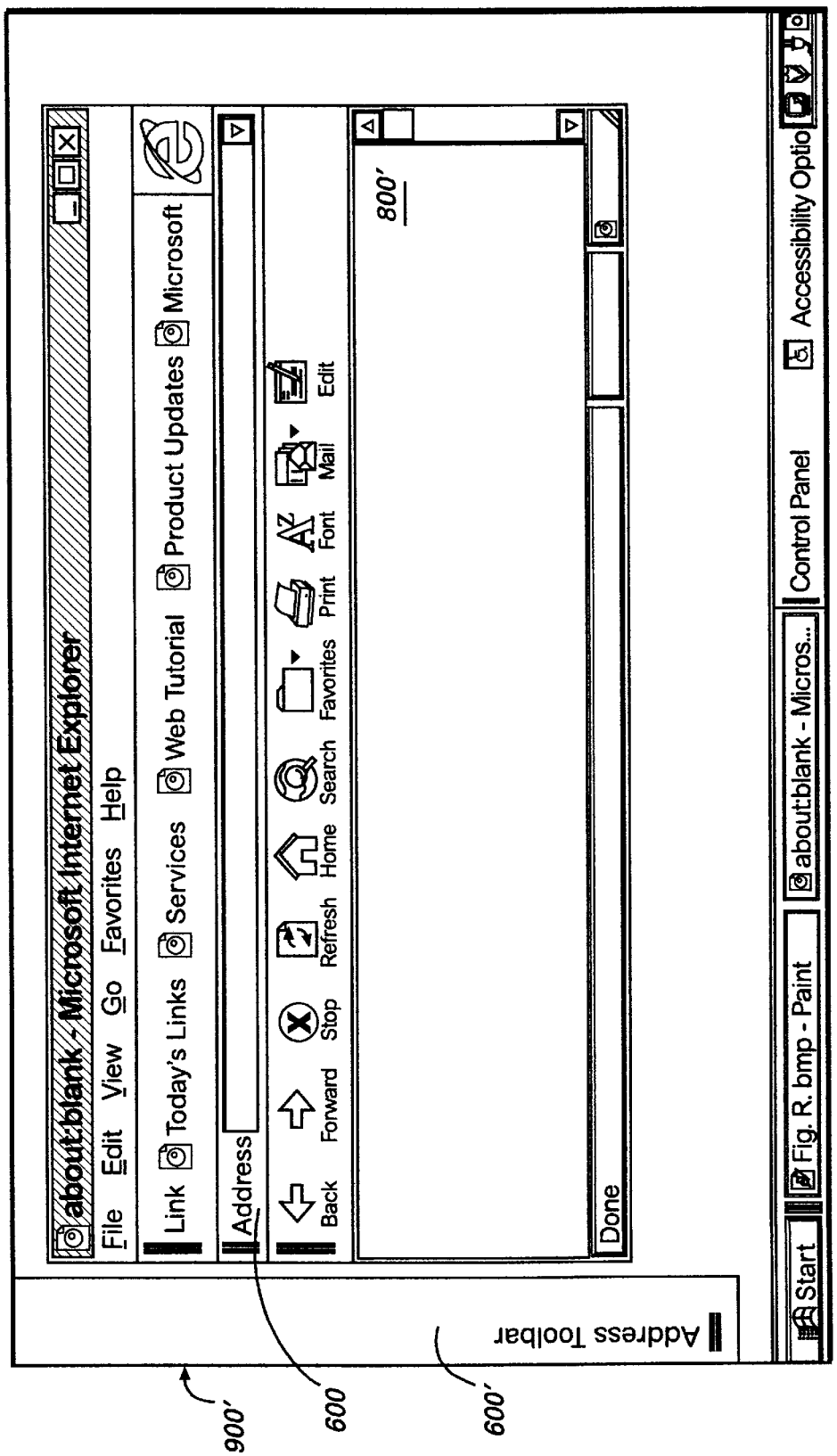

FIG. 19, consisting of FIGS. 19a–19c, depicts screen displays that illustrate a method for creating a deskbar in accordance with an exemplary embodiment of the present invention. Specifically, the deskbar can be created by direct on-screen manipulation using the mouse 42 (FIG. 1). In FIG. 19a, a screen display containing the application window 800 associated with the web browser application program 37 (FIG. 1) and a deskbar 310 is shown. The user can drag and drop a toolbar associated with the application window on some other area, either within the application window 800 or an area outside the application window 800 on the display screen 300. Afterwards, a deskbar is automatically created containing the toolbar.

For example, if the user desires to create a deskbar containing the address toolbar 600, the user can drag the address toolbar 600 from the application window 800 and drop the address toolbar 600 on an edge of the display screen 300. Consequently, a deskbar 900 is created containing the address toolbar 600 on the display screen 300, as shown in FIG. 19b. Moreover, the address toolbar 600 no longer appears in the application window 800.

Alternatively, referring to FIG. 19c, the address toolbar 600 can be copied from the application window 800' during the dragging process. Hence, a deskbar 900' is created containing an address toolbar 600', but the application window 800' still contains the address toolbar 600.

Figure 20A:
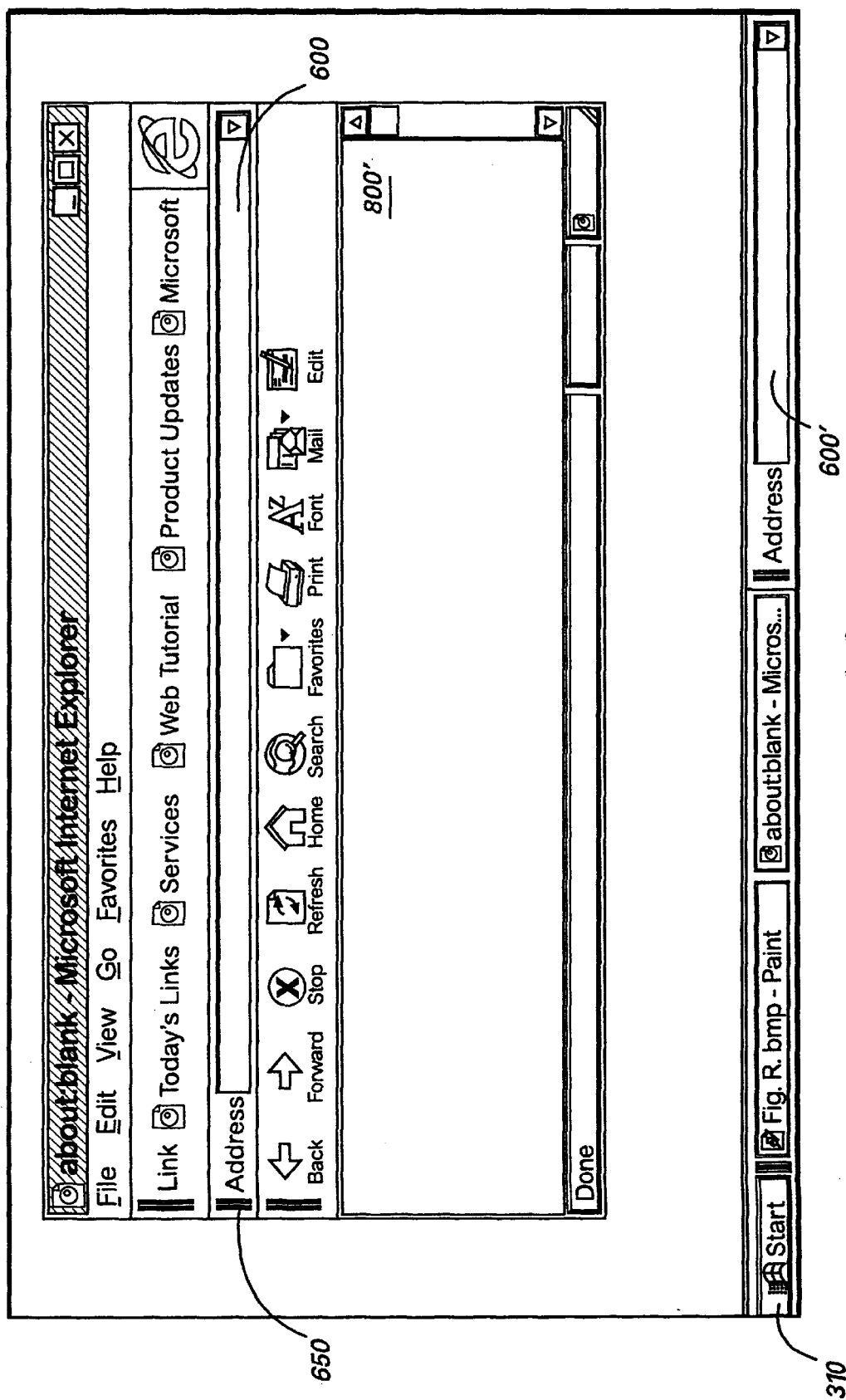
FIG. 20, consisting of FIGS. 20a–20b, depicts screen displays illustrating a method for customizing a deskbar in accordance with an embodiment of the present invention.
Figure 20B:
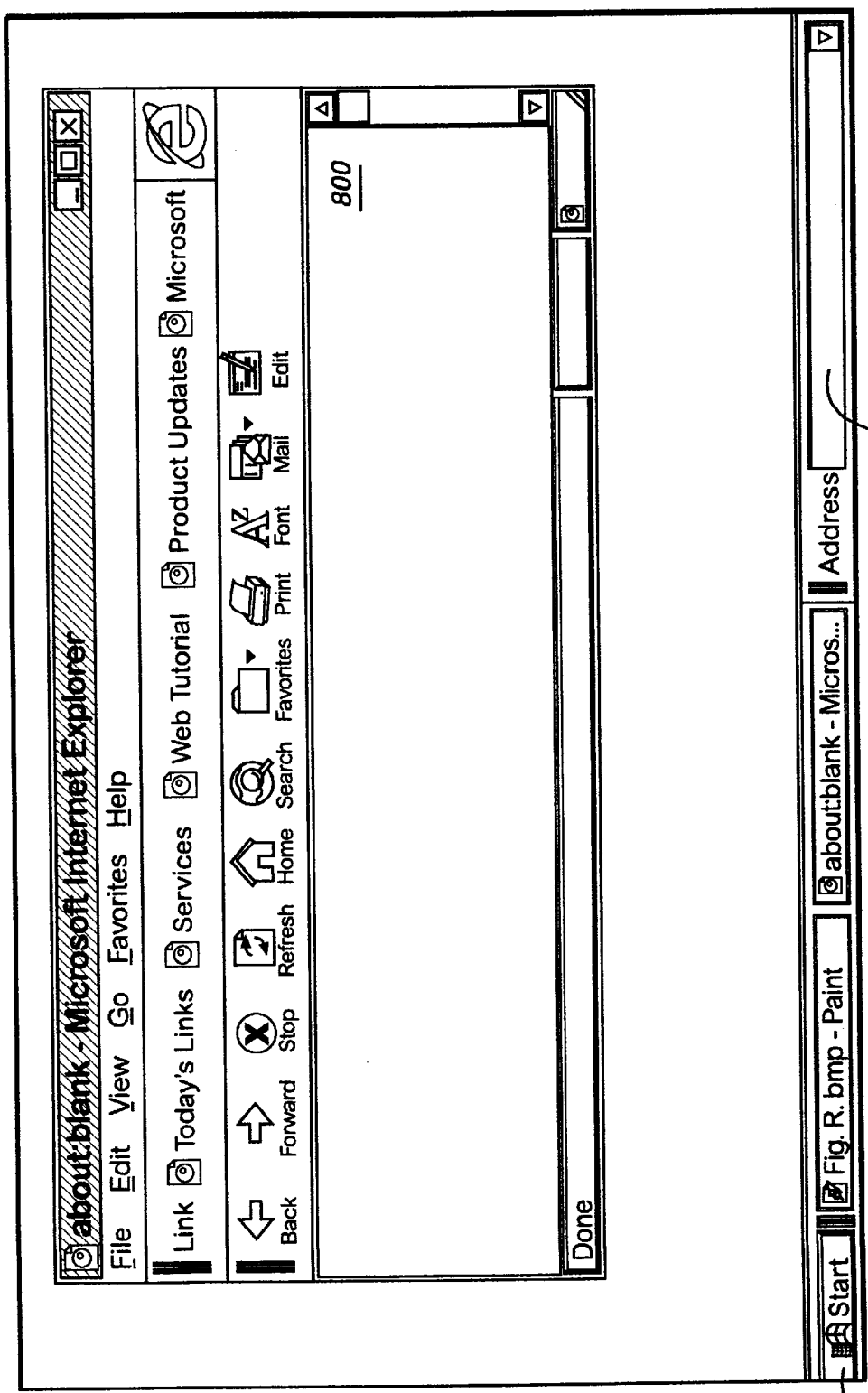

FIG. 20, consisting of FIGS. 20a–20b, depicts screen displays illustrating a method for customizing a deskbar in accordance with an exemplary embodiment of the present invention. Similar to creating a deskbar as described in connection with FIGS. 19a–19c, a deskbar can be customized by direct on-screen manipulation using; the mouse 42 (FIG. 1). In FIG. 20a, if the user desires to customize the taskbar 310 by adding an address toolbar 600', the user can drag the address toolbar 600 from the application window 800' and drop the address toolbar 600 on top of the taskbar 310. The address toolbar 600 is copied during the dragging process. Consequently, the address toolbar 600' appears in the taskbar 310, and the application window still contains the address toolbar 600.

Alternatively, referring to FIG. 20b, the address toolbar 600 is removed from the application window 800 and is displayed in the taskbar 310 via drag and drop manipulation.

It will be appreciated by those skilled in the art that the present invention is not limited to direct manipulation of toolbars located with the web browser application program, but may include any deskbar-aware application program and operating system.

COMPUTER-IMPLEMENTED PROCESSES FOR CREATING AND CUSTOMIZING A DESKBAR

Figure 21:
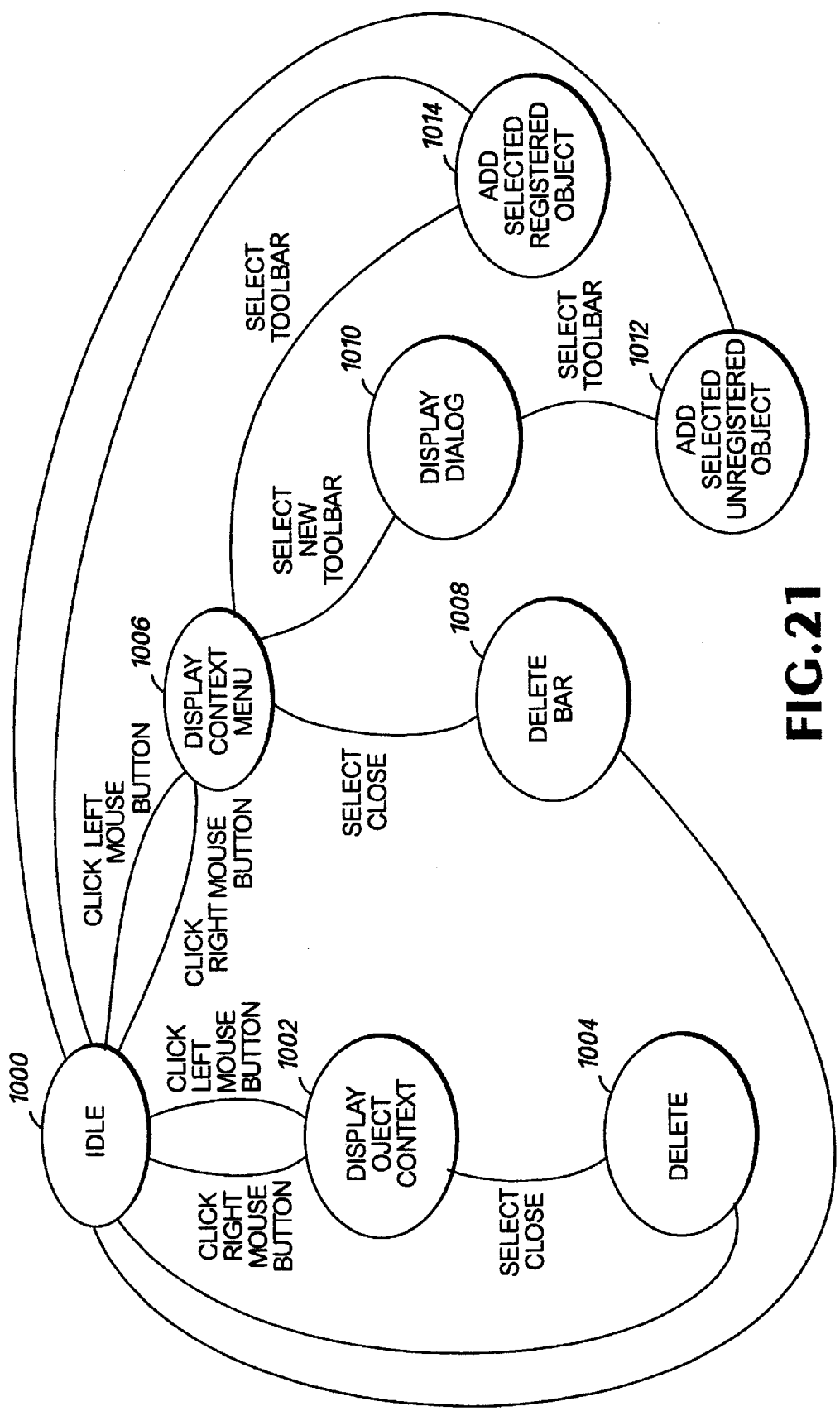
FIG. 21 is a state diagram illustrating an exemplary computer-implemented method for adding and deleting deskbands in an existing deskbar based on user-provided input.

Referring to FIG. 21, a method by which a computer customizes an existing deskbar will be described through use of a state diagram. FIG. 21 is a state diagram that illustrates a computer-implemented method for adding and closing deskbands in an existing deskbar based on user-provided input. Those skilled in the art will appreciate that the process described by the state diagram of FIG. 21 is executed by the processing unit 21 (FIG. 1) in response to instructions that have been incorporated into various program modules, including the operating system, web browser, etc.

Those skilled in the art will also understand that the operating system and browser program modules employ a variety of techniques that facilitate communications between the computer hardware and various program modules. For example, a deskband in a toolbar has an object identifier that is used to identify the element. These features allow data to be passed back and forth between various processes and facilitates interaction with the user via the mouse and other input devices.

The method starts in an initial IDLE state 1000. A time interval elapses between each change of state, and the changes are dependent upon the current input event.

In the IDLE state 1000, the exemplary application program 37 (FIG. 1) is running, a deskbar in a toolbar is displayed on the display area of the display screen, and a user may be performing any one of a number of activities, such as browsing web pages, performing a search, and the like. However, the program is idle in the sense that no action is taken with respect to adding or closing a deskband in a deskbar or closing a deskbar if no user input occurs.

If the user desires to close the deskband on a deskbar, the user can simply click the right mouse button on the deskband. After the user clicks the right mouse button on the deskband, the state changes to the DISPLAY OBJECT CONTEXT state 1002. In state 1002, a context menu associated with the deskband appears on the display screen. At this point, the user can click the left mouse button on the deskband, thereby dismissing the context menu and returning to the IDLE state 1000.

If the user remains in state 1002, the user can close the deskband so that it no longer appears in the deskbar by selecting a close option in the context menu. If the user selects the close option in the context menu, the state changes to the DELETE state 1004, in which case, the deskband is closed. The process then returns to the IDLE state 1000.

If the user desires to close the deskbar itself, the user can do so by clicking the right mouse button on the deskbar. The state changes from the IDLE state 1000 to the DISPLAY CONTEXT MENU state 1006. In state 1006, a context menu associated with the deskbar is displayed on the display screen. At this point the user can click the left mouse button on the deskbar to dismiss the context menu and return to the IDLE state 1000.

If the user remains in state 1006, the user can close the deskbar by selecting a close option in the context menu. If the user selects the close option, the state changes to the DELETE BAR state 1008, in which case the deskbar is closed and no longer appears on the display screen. The state then returns to the IDLE state 1000.

While in the state 1006, the user also has the option of adding a registered or an unregistered deskband to the deskbar. To add a unregistered deskband, the user simply selects a new toolbar option. When the new toolbar option is selected, the state changes to a DISPLAY DIALOG state 1010. In state 1010, a dialog box is displayed on the display screen and contains various application programs and other computer functions that the user can select. The user then selects one of the options available, in which case, the stale changes to the ADD SELECTED UNREGISTERED OBJECT state 1012. In state 1012, the unregistered deskband is added to the deskbar. The state then returns to the IDLE state 1000.

If the user desires to add a registered deskband, the user simply selects one of the toolbars displayed in the context menu. The state changes to the ADD SELECTED REGISTERED OBJECT state 1014. In state 1014, the unregistered deskband is added to the deskbar. The state then changes back to the IDLE state 1000.

Figure 22:
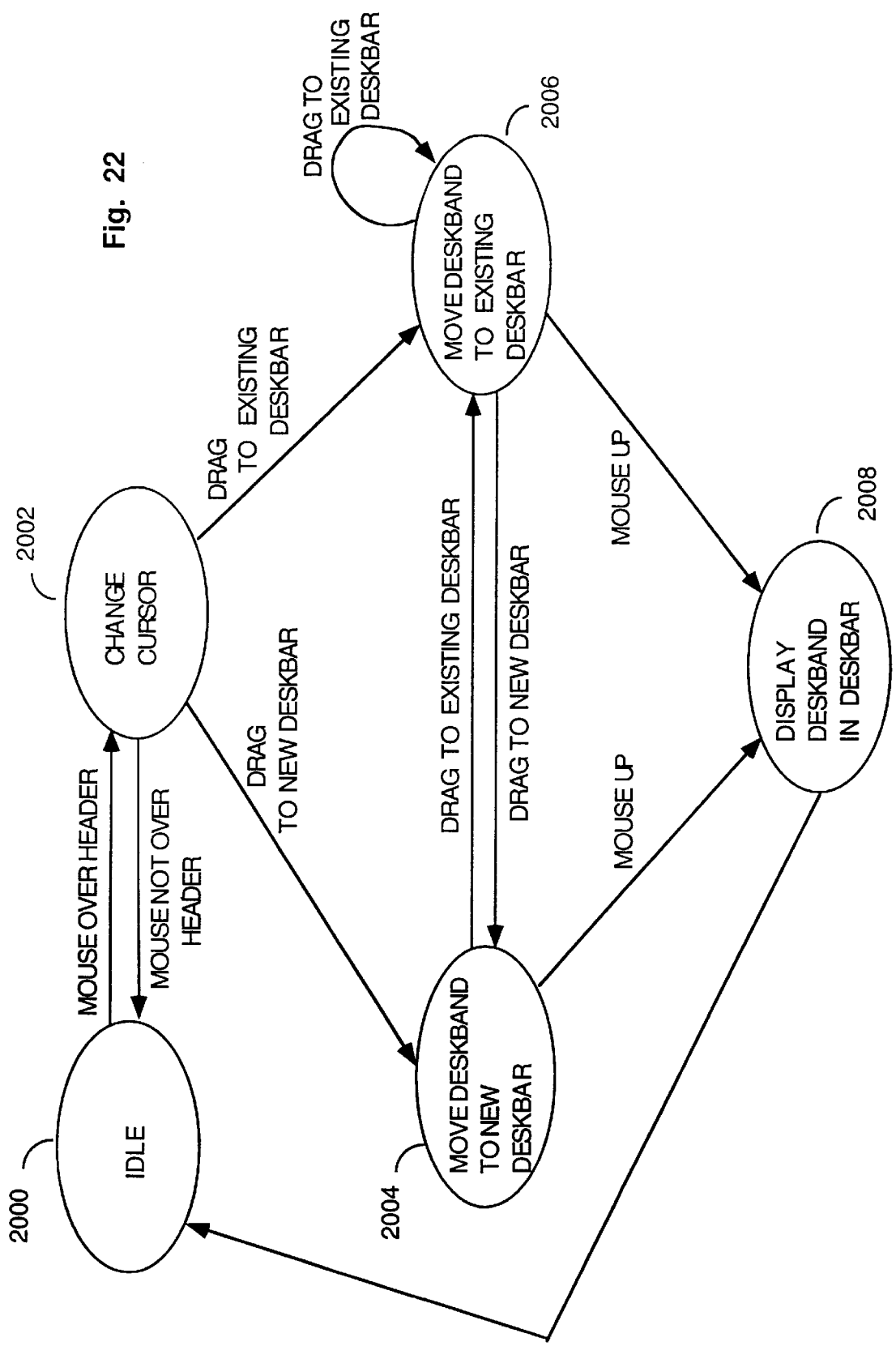
FIG. 22 is a state diagram illustrating an exemplary computer-implemented method for creating and customizing a deskbar based on user-provided input.

FIG. 22 is a state diagram that illustrates an exemplary computer-implemented method for creating and customizing a deskbar based on user-provided input. Those skilled in the art will appreciate that the process described by the state diagram of FIG. 22 is executed by the processing unit 21 (FIG. 1) in response to instructions that have been incorporated into various program modules, including the operating system, web browser, etc.

Those skilled in the art will also understand that the operating system and browser program modules employ a variety of techniques that facilitate communications between the computer hardware and various program modules. For example, a deskband in a toolbar has an object identifier that is used to identify the element. These features allow data to be passed back and forth between various processes and facilitates interaction with the user via the mouse and other input devices.

The method starts in an initial IDLE state 2000. A time interval elapses between each change of state, and the changes are dependent upon the current input event.

In the IDLE state 2000, the exemplary application program 37 (FIG. 1) is running, a deskband in a toolbar is displayed on the display area of the display screen, and a user may be performing any one of a number of activities, such as browsing a web page, performing a search, and the like. However, the program is idle in the sense that no action is taken with respect to creating or customizing a deskbar if no user input occurs.

If the user moves the mouse so that the cursor is positioned over a header of the deskband, the state changes to a CHANGE CURSOR state 2002. In state 2002, the appearance of the cursor changes to indicate that it is within a relocate area. At this point, the user can move the mouse so that the cursor is no longer positioned over the header of the deskband, thereby returning to the IDLE state 2000, or the user can leave the cursor in the relocate area so that the state remains in the CHANGE CURSOR state 2002.

If the user chooses the latter, the user has the option of either dragging the deskband to an existing deskbar or to a new deskbar by pressing and holding the mouse button. If the user drags the deskband to an existing deskbar, the state changes to a MOVE DESKBAND TO EXISTING DESKBAR state 2006, in which case, the deskband is moved to the existing deskbar. If the user continues to drag the deskband to an existing deskbar, the deskband remains in state 2006 and is moved from one existing deskbar to another existing deskbar. However, if the user drags the deskband to a new deskbar, the state changes to a MOVE DESKBAND TO NEW DESKBAR state 2004, in which case, a new deskbar is created containing the moved deskband.

In state 2006, if the user drags the deskband to a new deskbar, the state changes to the MOVE DESKBAND TO NEW DESKBAR state 2004. On the other hand, in state 2004, if the user moves the deskband to the existing deskbar, the state changes to the MOVE DESKBAND TO EXISTING DESKBAR state 2006.

Once the user has moved the deskband to either a new deskbar or an existing deskbar, the user can then release the mouse button, thereby changing the state to a DISPLAY DESKBAND IN DESKBAR state 2008. The deskband is displayed in the desired deskbar, and the state returns to the IDLE state 2000.

CONCLUSION

The present invention provides a system and method for uniformly creating, displaying, and manipulating components or band objects on a desktop so they can be created and used by multiple application programs. In one embodiment, an architectural component known as a deskbar manages and presents sets of tool-type UI components for accessing data and implementing functions associated with multiple application programs. The deskbar facilitates easy extensibility and interoperation of toolbar items associated with multiple application programs. The deskbar may simultaneously contain toolbars and toolbar components from multiple application programs, and may exist in an application window or on the desktop. A user is then able to use these toolbar components and toolbars to perform their standard functions at any time without being require(d to directly access the specific application program that is associated with the toolbar component or toolbar.

In addition, the present invention provides a flexible architecture that serves as a platform to developers for providing deskbars and deskbands in any application program or browser without having to design every intricate detail. Whereas, at one time, the developer had to design every component or feature that the developer needed to provide specific functionality, the developer now is able to plug into this architecture through the architecture's external interfaces to access the features provided without having to develop these specific features and without having to know the architecture's internal implementation details that provide these features.

Although the invention has been described in the context of a web browser program that runs in the "WINDOWS 95" operating system environment and employs OLE and other functionality, those skilled in the art will appreciate that the invention is applicable to a variety of program modules, including operating system software and application programs, and may be implemented in other operating environments.

Alternative embodiments will become apparent to those skilled in the art to which the present invention pertains without departing from its spirit and scope. Accordingly, the scope of the present invention is defined by the appended claims rather than the foregoing description.

What is claimed is:

1. In a computer system including a display device and an input device and employing a graphical user interface (GUI), a method for creating a deskbar, comprising the steps of:

displaying a first existing deskbar having a deskband in a predetermined area;

receiving from the input device an indication that the deskband has been moved out of the predetermined area;

in response to the indication that the deskband has been moved out of the predetermined area, determining whether the deskband has been moved to a second existing deskbar; and in response to the deskband not being moved to the second existing deskbar, creating a new deskbar containing the deskband.

2. The method of claim 1, further comprising the step of displaying, in response to the deskband being moved to a second existing deskbar, the deskband in the second existing deskbar.

3. The method of claim 1, wherein the first existing deskbar is associated with an application window.

4. The method of claim 1, wherein the deskband is selected from a group including an icon, a toolbar, and a status bar.

5. The method of claim 1, further comprising the steps of:

receiving from the input device an indication that a pointer has been positioned over a portion of the deskband; and in response to the pointer being positioned over a portion of the deskband, changing the pointer to a predetermined icon indicating that the deskband can be moved.

6. A method for manipulating and using band objects between applications windows associated with their respective application programs and a desktop associated with a host operating system, comprising the steps of:

moving a band object from a first application window associated with a first application program to the desktop;

in response to moving the band object; creating a deskbar on the desktop for hosting the band object;

accessing a second application program; and using the band object in connection with the second application program without accessing the first application program.

7. The method of claim 6, wherein the band object provides access to a function associated with the first application program.

8. The method of claim 6, wherein the deskbar manages the display screen real-estate for the band object by negotiating space with the host operating system.

9. The method of claim 6, further comprising the steps of accessing a third application program and moving an associated band object to the desktop so that the associated band object can be used in the context of any application program without having to access or execute the third application program.

10. A computer-readable medium on which is stored a program module for creating a new deskbar and customizing an existing deskbar, the program module comprising instructions which, when executed by a computer, perform the steps of:

displaying a first existing deskbar having a deskband in a predetermined area;

receiving an indication that the deskband has been moved out of the predetermined area;

in response to the indication that the deskband has been moved out of the predetermined area, determining whether the deskband has been moved to a second existing deskbar;

in response to the deskband not being moved to the second existing deskbar, creating a new deskbar containing the deskband; and in response to the deskband being moved to the second existing deskbar, displaying the deskband in the second existing deskbar.

11. The method of claim 10, wherein the first existing deskbar is associated with an application window.

12. The method of claim 10, further comprising the step of removing the deskband from the first existing deskbar.

13. The method of claim 10, wherein the deskband is copied from the first existing deskbar so that the deskbar is displayed in both the first existing deskbar and the new deskbar or second existing deskbar.

14. The method of claim 10, wherein the deskband is selected from a group including an icon, a toolbar, and a status bar.

* * * * *